Aug. 3, 1937.  H. P. BOSWAU ET AL  2,088,942
QUOTATION SYSTEM
Original Filed July 15, 1932   15 Sheets-Sheet 1

Aug. 3, 1937.   H. P. BOSWAU ET AL   2,088,942
QUOTATION SYSTEM
Original Filed July 15, 1932   15 Sheets—Sheet 15

INVENTORS
Hans P. Boswau
Raymond M. Hicks
Ward, Crosby & Neal
ATTORNEYS

Patented Aug. 3, 1937

2,088,942

UNITED STATES PATENT OFFICE 2,088,942

QUOTATION SYSTEM

Hans P. Boswau, Lorain, Ohio, and Raymond M. Hicks, Plainfield, N. J.; said Boswau assignor to The North Electric Manufacturing Company, Galion, Ohio, a corporation of Ohio, and said Hicks assignor to The Teleregister Corporation, New York, N. Y., a corporation of Delaware Application July 15, 1932, Serial No. 622,628
Renewed June 5, 1935

30 Claims. (Cl. 177—353)

This invention relates to a system for supplying stock market quotations to various subscribers.

Among the objects of this invention is the provision of mechanism by means of which any one of a large number of subscribers may electrically transmit his request for the price quotations of any desired stock to the one of a plurality of central transmitting operators who is assigned to transmit information in reference to a particular group of stocks including such desired stock, and the provision of mechanism whereby such operator may transmit electrically to indicating means located in the subscriber's office the code of the stock requested and the price quotations relating to such stock.

A more specific object of the invention is the provision of a system in which each of a large number of subscribers is provided with stock designation indicators, and preferably with "open", "high", "low" and "last" price indicators, together with dialing mechanism or the like by means of which any stock designation may be sent to a central transmitting station and set up on a group of indicators, the mechanism including means for transmitting the stock designation to the operator assigned to send out the price quotations of the particular stock requested, and the central transmitting station including keyboard means upon which the stock designation and the prices relating to such stock may be set up, together with transmitting mechanism for transmitting such stock designation and prices to the indicator equipment of the subscriber requesting the information.

Other objects of the invention include means for controlling and facilitating the operation of such equipment, including means in the transmitting station for automatically blanking out the indicators of the subscriber desiring such operation or requesting information as to prices of stocks, and for automatically blanking out the indicators associated with the equipment of the particular operator who transmits such information to the subscriber.

Other objects of the invention will appear from the following description taken in connection with the drawings, in which Fig. 1 is a schematic wiring diagram of the entire system; and Figs. 2 to 14 taken together show a more detailed wiring diagram of the entire system, of which Fig. 2 is a diagram of the equipment located at each subscriber's office or station;

Figure 2:
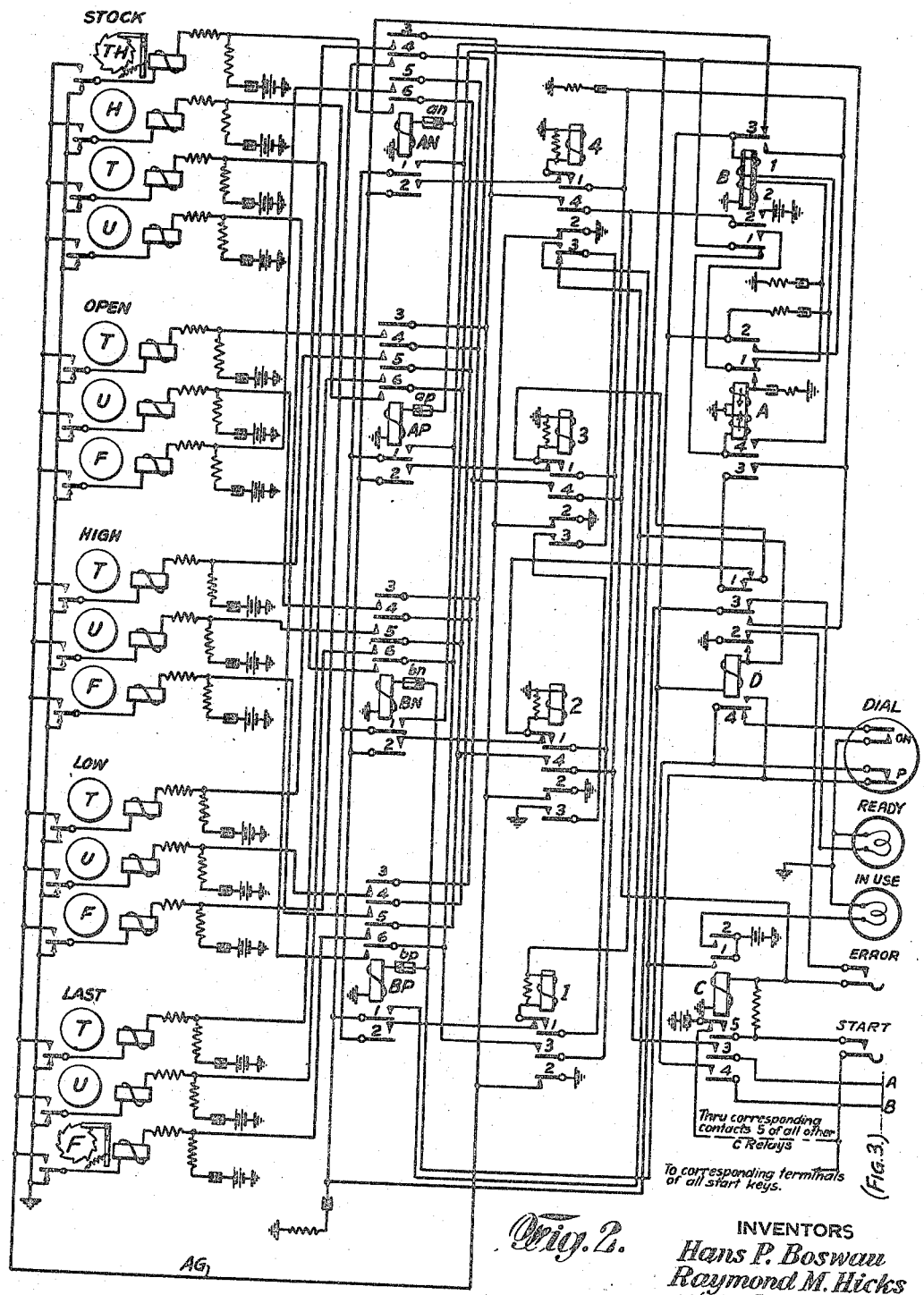
Figure 5:
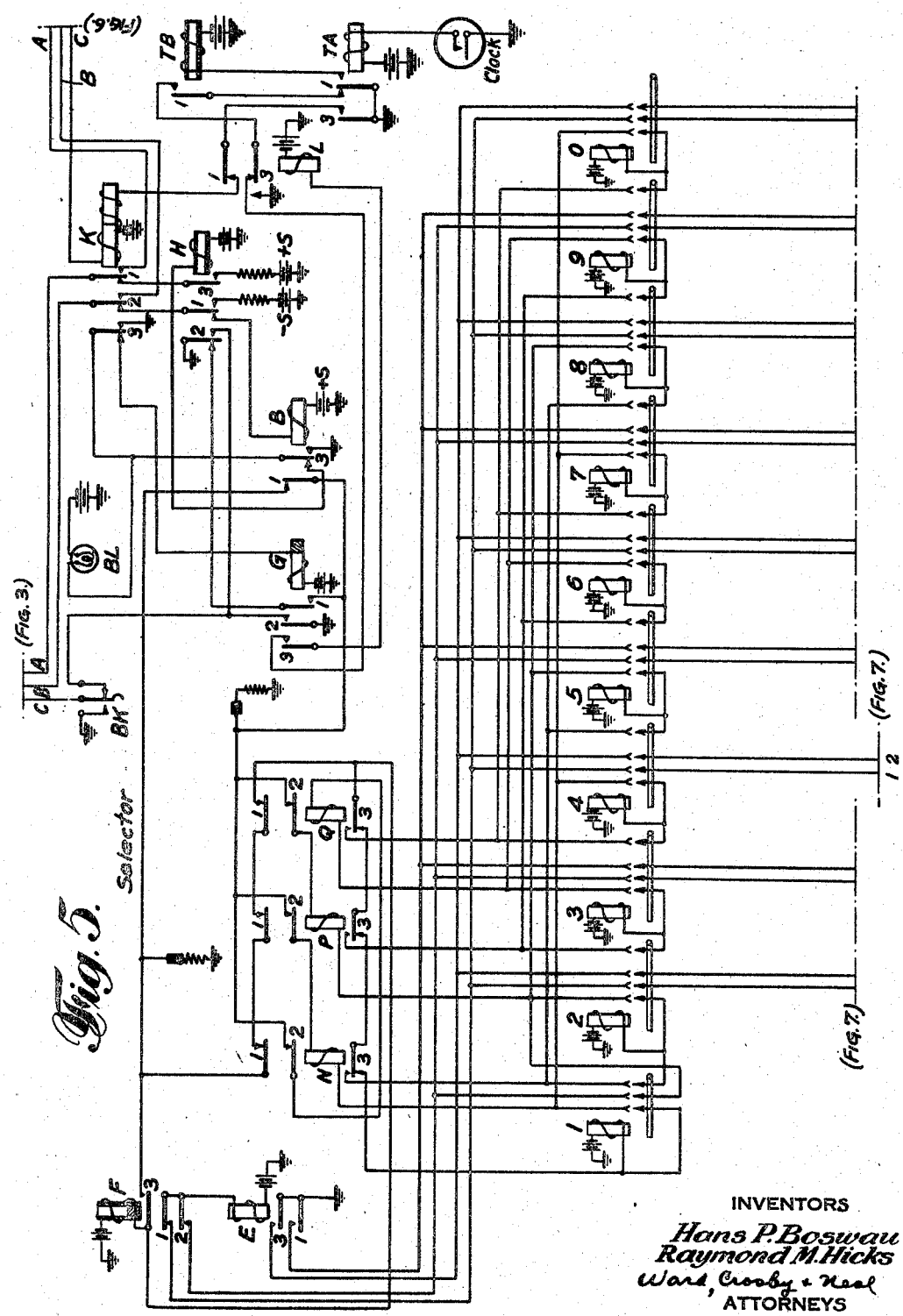
Figure 6:
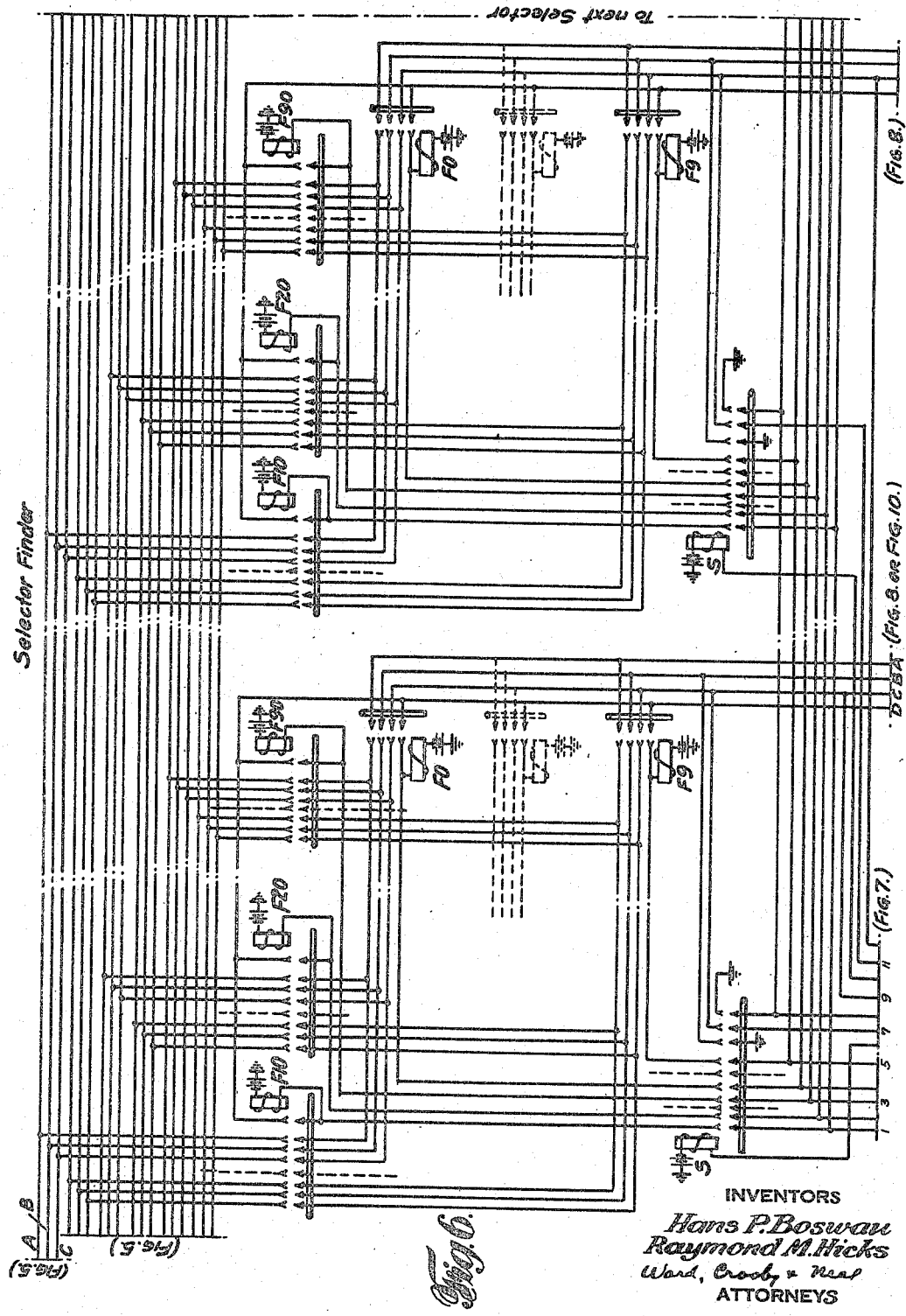
Figure 7:
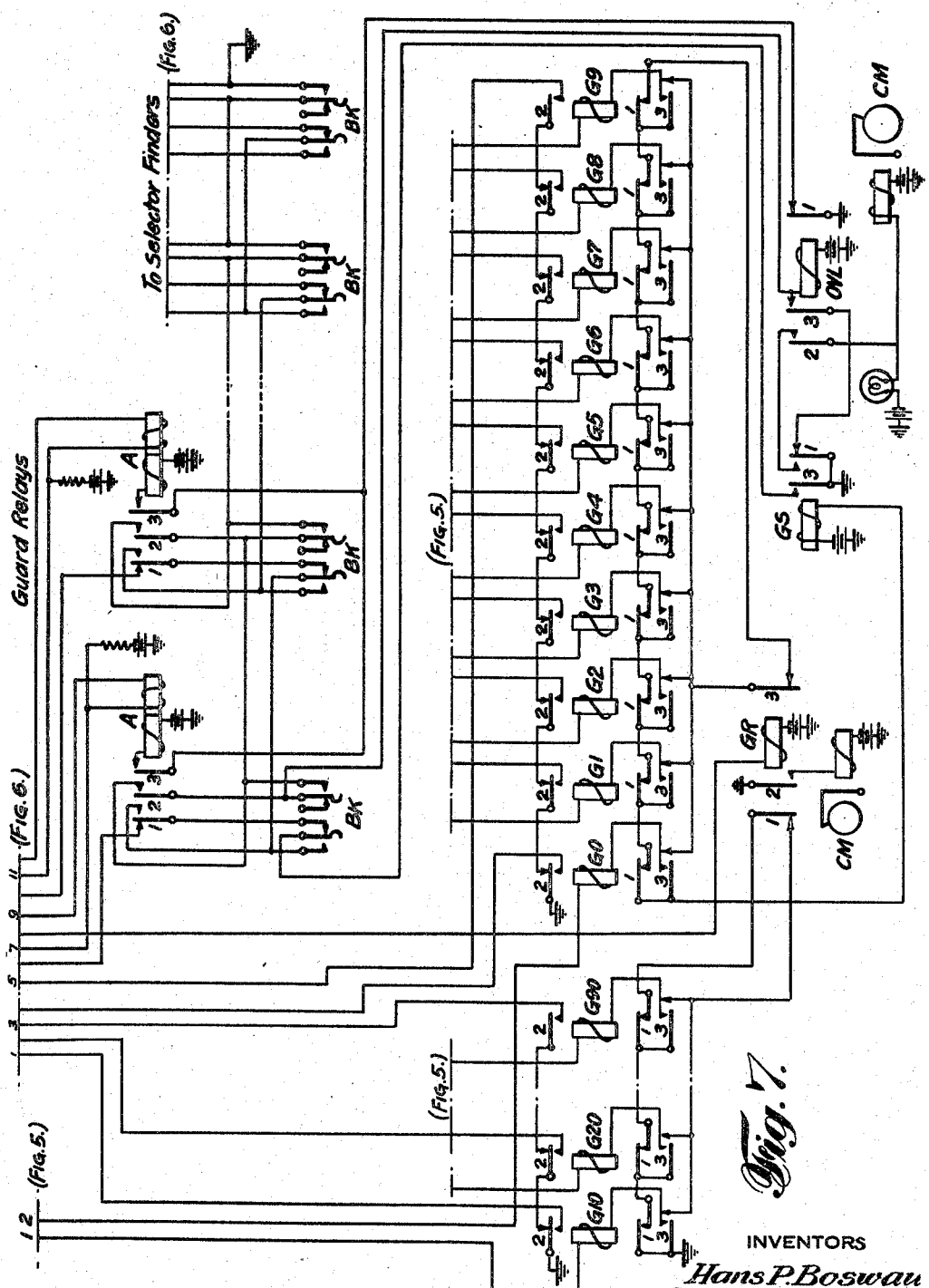
Figure 8:
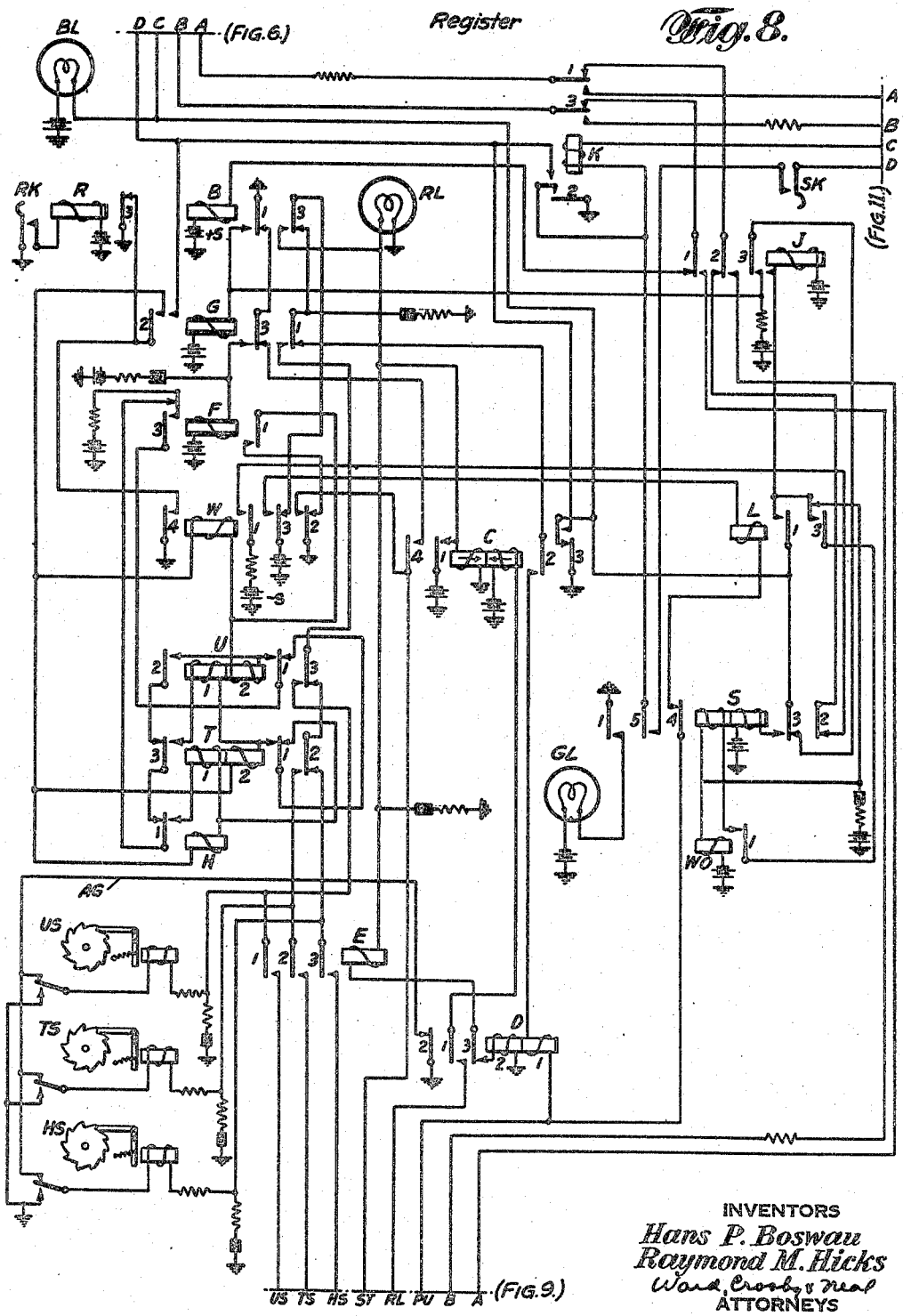
Figure 9:
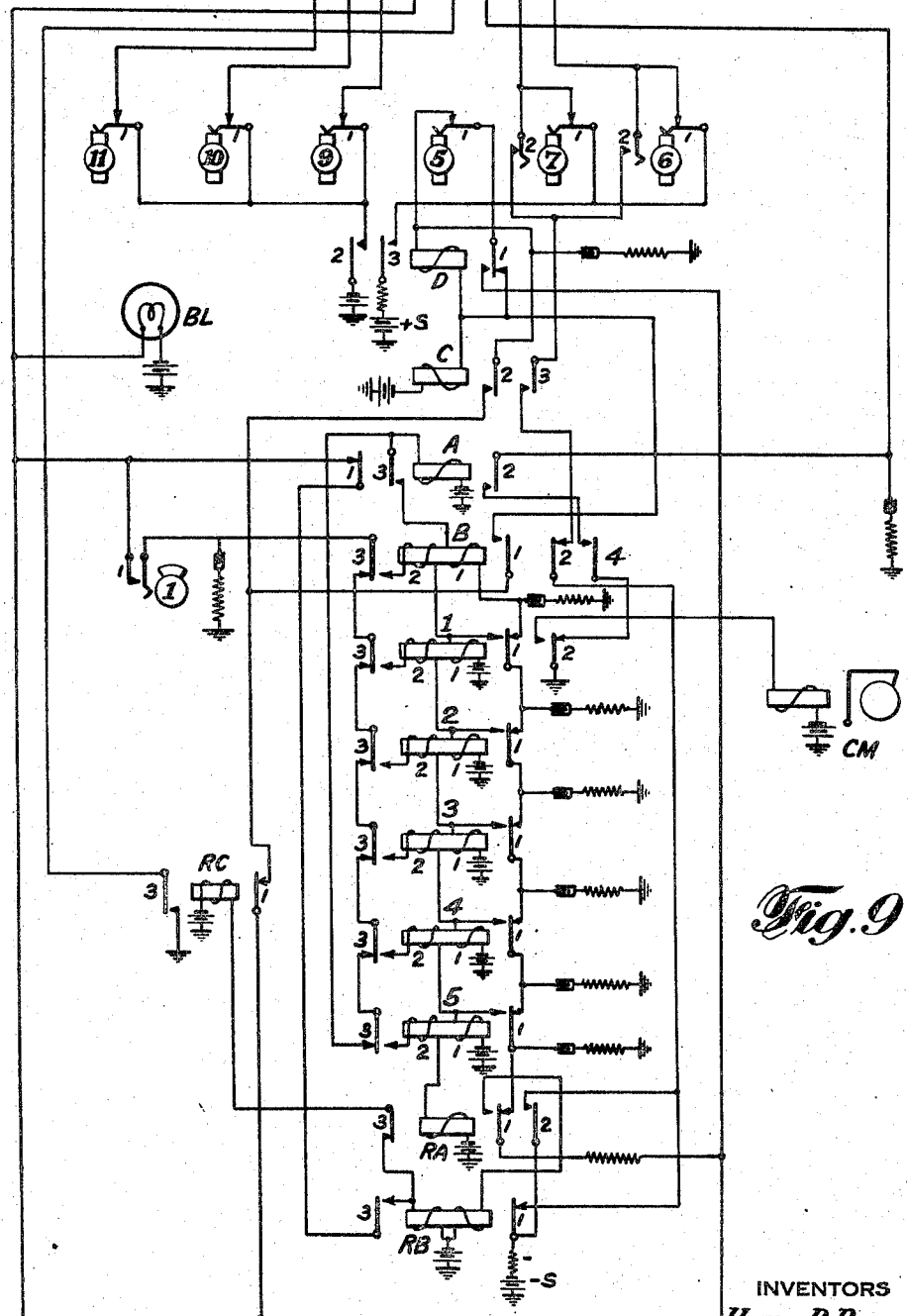
Figure 10:
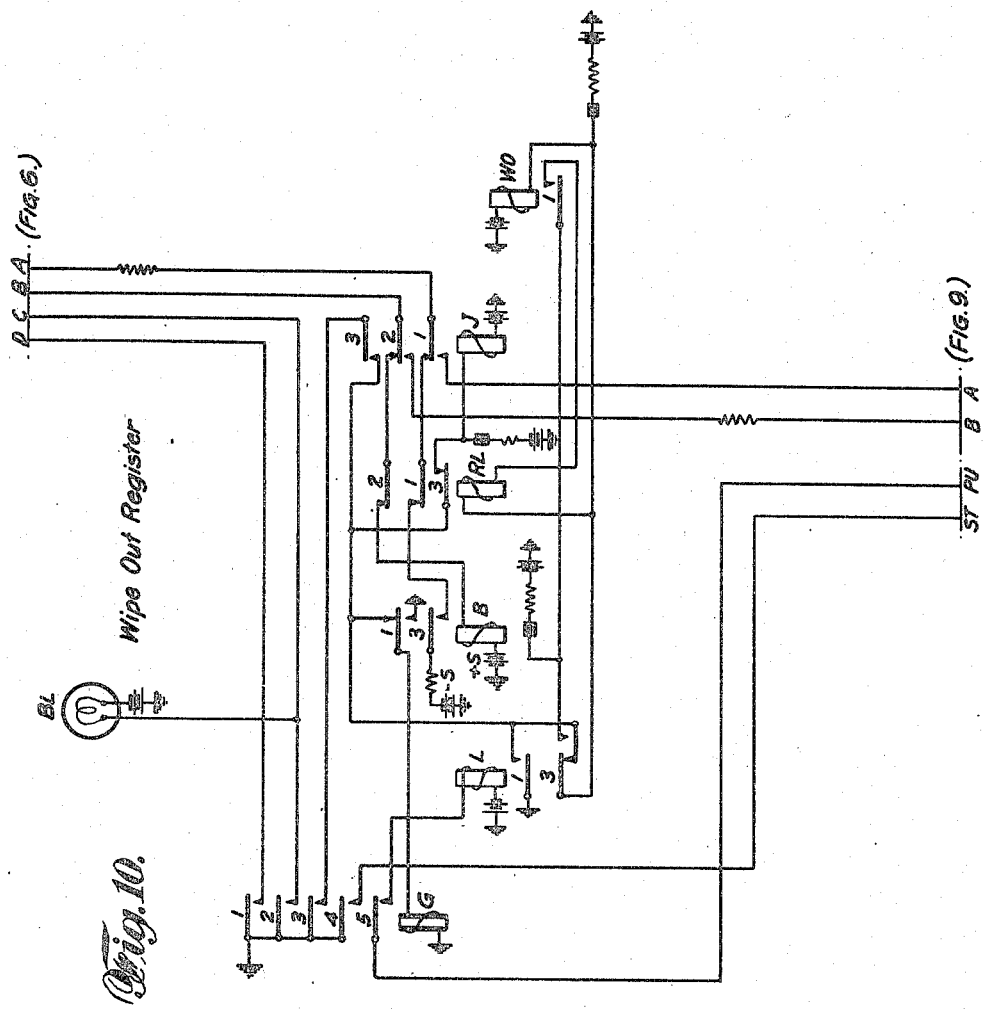
Figure 15:
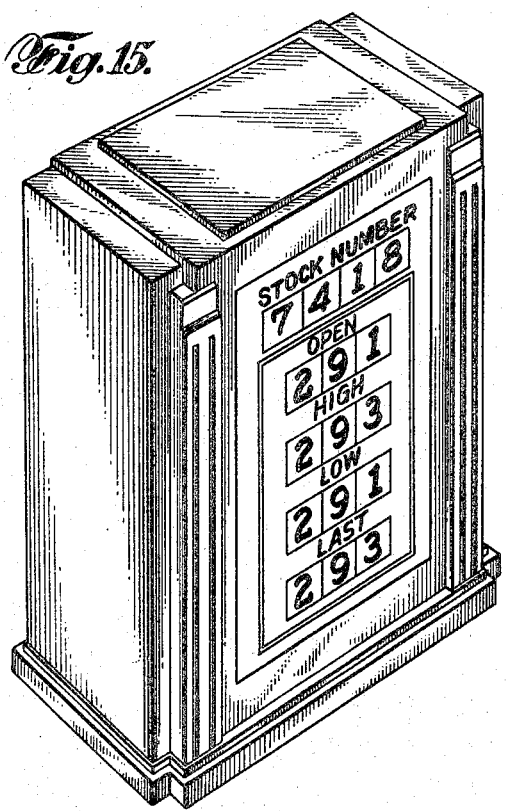
Figure 16:
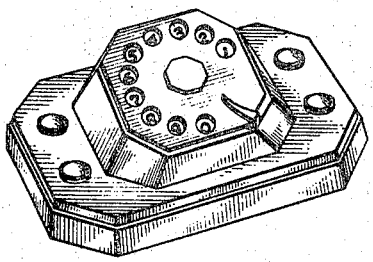

Figs. 5 to 14 inclusive show the equipment located at the central operating station;

Fig. 5 shows the selector equipment for selecting a particular operator by selecting a group of selector finders;

Fig. 6 shows one group of selector finders, the function of which is to extend the subscriber's line through to a register group shown on Fig. 8;

Fig. 7 shows the guard circuit associated with and used for assigning selector finders;

Fig. 8 shows one of the register groups used when the first digit of the stock number is any number from two to nine;

Fig. 9 shows a wipe-out sender, the function of which is to restore the indicators at the subscribers' and operators' stations to the blank position;

Fig. 10 shows relay mechanism for controlling the wipe-out sender to blank out the subscriber's indicators when no new quotation is desired;

Figs. 11 to 14 inclusive show the operator's keyset and associated sending equipment for transmitting the stock number and prices back to the subscriber;

Fig. 15 shows the dial set display unit which is diagrammatically shown on Fig. 2; and Fig. 16 shows the dial unit associated with the dial set of the subscriber's installation.

Figure 1:
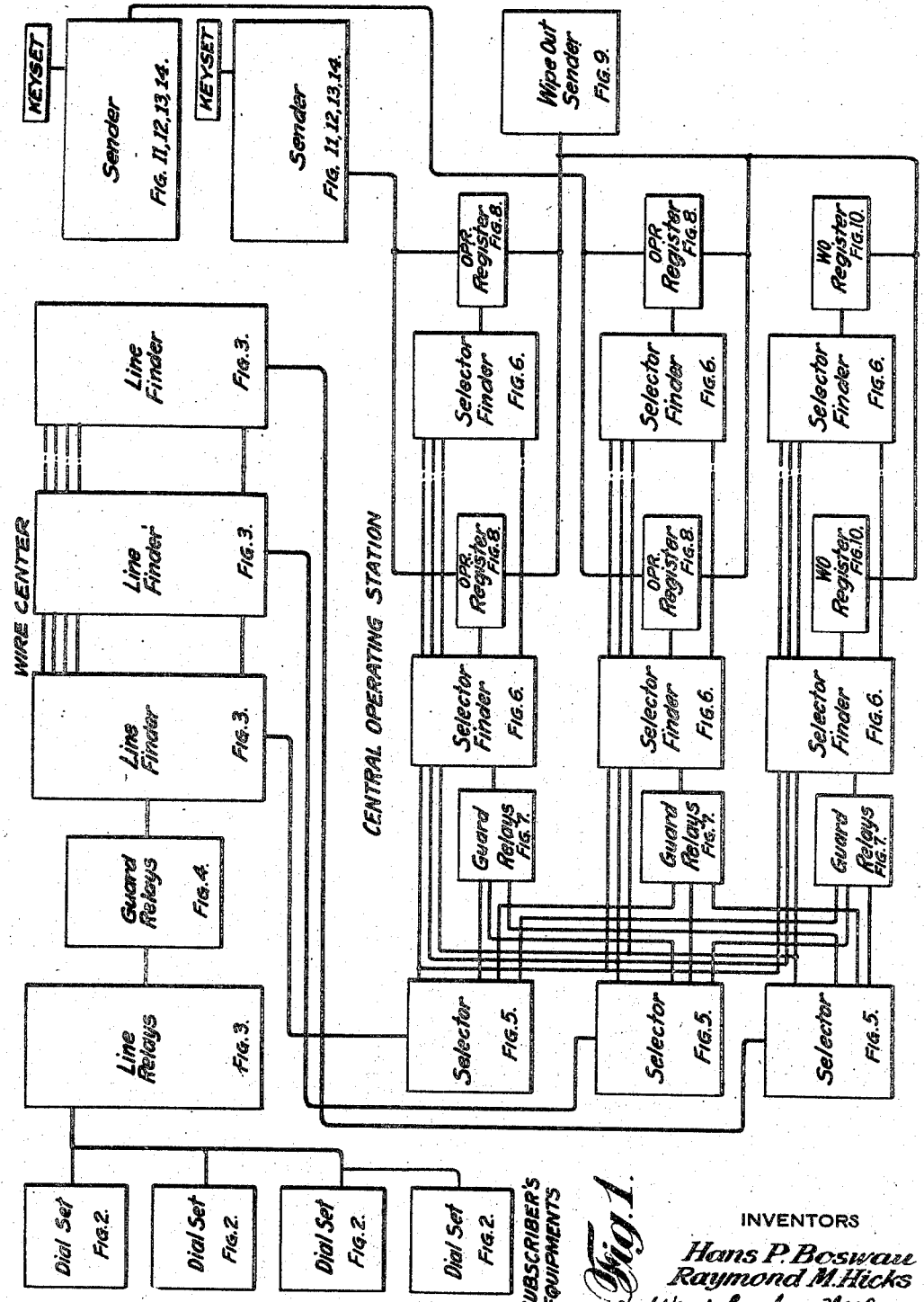

The function of the various mechanisms indicated diagrammatically in Fig. 1 is as follows:

A number of subscriber dial sets are shown, each one as shown in Fig. 2, consisting of a dial similar to that on an automatic telephone, a dial key for originating a call, a dial lamp to indicate that the dial may be operated to transmit the stock code number, a busy lamp to indicate that the line is in use by other dial sets, and an error key for restoring the dial set equipment to normal under certain conditions to be described hereinafter. A group of indicators is also included for displaying the stock number and the prices of that stock. Each subscriber's equipment is connected by means of two wires to a wire center at which point they terminate on line relay equipment. When a subscriber originates a call the line relay equipment sets in action one of several line finders, also located at the wire center, which connects the calling subscriber's line to one of a group of trunks from the wire center to the central operating station. Each trunk terminates on a selector at the operating center. The selector receives the first digit dialed by the subscriber and in accordance with this digit connects the subscriber's line through to one of several groups of selector finders. The selector finders when chosen by a selector connect the selector to an idle register. The subscriber now dials the three remaining digits of the stock number which appear on indicator units associated with the selected register and located in front of the operator. Upon completion of dialing the register connects the wipe-out sender to the subscriber's line and sends back pulses which blank out the previous stock number and quotation appearing on the indicator units at the subscriber's premises. Each group of selector finders and associated registers has access to a sender controlled by an operator. The operator, upon noting an incoming call which appears upon one of several registers in front of her, operates the keys of her sender setting up the price and the stock number. A green light associated with the register indicates that the subscriber's equipment has been blanked out, and this is a signal for the operator to depress the start key of that register and set her sender in operation. This sends back the new stock number and prices requested by the subscriber and the wipe-out sender simultaneously restores the indicators of the operator's register to the blank position. Should the subscriber desire to blank out the indicators, without requesting a new price, he may do so by dialing zero which chooses a special group of selector finders and registers, the purpose of which is, by means of the wipe-out sender, to send back sufficient pulses to blank out the subscriber's indicators. Such calls do not appear in front of an operator.

In the following description the progress of a call is traced from the subscriber's dial set equipment, through the line finders, to the selector, the register, and the sender.

Beginning at the subscriber's dial set, Fig. 2, to which we shall assign the number 29, the subscriber depresses the push button Start, closing a circuit from battery through the normal contact armature 5 of relay C, through key Start, through resistance and over the winding of relay C, to ground, thereby operating relay C. With the operation of relay C a path is provided from battery through the make contact 5 of relay C, through resistance, to the winding of relay C to hold relay C locked up. The operation of relay C connects battery through contact 2 of relay C, through lamp "In Use", to ground, thereby lighting the lamp. The operation of relay C also connects the line relays BN and BP to negative battery on line B over its contact 4. The relays AN, AP, BN and BP may be polarized relays or neutral relays made responsive to one polarity only by rectifiers, an, ap, bn and bp. The connection of line B to the line relays BN and BP closes a circuit for the operation of relay LR29 in the line finder, Fig. 3. The circuit is from ground through the winding of line relay BN, rectifier bn, pulsing contacts of the dial, contact 4 of the relay C, over the line B, through normal contact 3 of relay CO29 to the winding of relay LR29. Relays BN and BP do not operate at this time due to the low value of current flowing. The operation of relay LR29 connects ground through contact 1, over line 4, over winding of relay G20, Fig. 4, through the normal contact 3 of relay G20, through the normal contact 1 of relay GR, through the normal contact 1 of relays G90 to G10, through resistance, to battery. This operates relay G20, which opens the operating and holding circuits for the other relays of this group to prevent double connections. The operation of relay G20 connects ground through its contact 2 to relay U20 thereby operating it. The operation of relay U20 closes a path from ground, through contact 3 of relay LR29, over line 6, through a contact of relay U20, through the winding of relay G9, through the normal contact 3 of relay G9, through the normal contact 3 of relay GR, through the normal contact 1 of relay G9 through the normal contacts 1 of relays G8, G7, — — — — — G0, through resistance, to battery. This operates relay G9.

The operation of relay G9 connects ground through contact 2, through pole 23 of a double throw switch to pole 5, over line 17, through the normal contact 1 of relay A to the winding of relay S of line finder 1. The operation of relay S closes a path through its contacts from ground on contact 2 on relay G20, Fig. 4, over line 11, and ground from contact 2 of relay G9, over line 14, through the contacts of the S relay to the winding of relay F20 and the winding of relay F9. This operates relays F20 and F9 closing a circuit for the two lines A and B from subscriber 29 and from the winding of relay CO29 to trunk lines A, B, C connected to a selector, Fig. 5. The circuit for the three wires mentioned above is through the contacts of relay F20 and then through the contacts of relay F9. The operation of relay S also operated relay GR, over line 15, thereby opening the operating paths of the other guard relays. Meanwhile, the guard relays which had been operated locked up through their own make before break contacts 3. The operation of relay S also connected ground to line B of the trunk, and this ground coming over the trunk through the normal contact 2 of relay K in the selector, Fig. 5, and through the normal contact 1 of relay H, operated relay B and short-circuited relays BN and BP in the subscriber's equipment, Fig. 2. The operation of relay G9 also opened the operating and holding circuits for the other relays of this group to prevent double connections.

The operation of relay B connects ground through the normal contact 3 of relay K, through the contact 3 of relay B, to operate relay G. The operation of relay G connects ground through contact 2, through normally closed contact of key BK, to line C of the trunk back to line finder 1 which operates relay CO29, Fig. 3, over a path through contacts of relays F20 and F9. The operation of relay B also lights the selector busy lamp BL. The operation of relay CO29 opens contact 3 of the circuit to relay LR29. The release of relay LR29 deenergizes relays G20 and G9, Fig. 4. The release of relay G20 releases relay U20, and the release of relay G9 releases relay S, Fig. 3. The release of relay S and the release of relays G20 and G9 opens the operating path of relays F20 and F9, but these relays lock up through their own contacts, through the winding of relay A, to ground on lead C of the trunk. The release of relay S also removes a short-circuit from the relays BN and BP and the winding of relay A, permitting relay A to operate. The operation of relay A switches the next incoming call to the next idle line finder. The foregoing occurs before the subscriber dials, and throughout the duration of the call relays CO29, F9, F20 and A will be held operated.

Referring to the selector, Fig. 5, it will be seen that positive signaling battery through the winding of relay B, through the normal contact 1 of relay H, and 2 of relay K, is fed out over line B to the subscriber's equipment, Fig. 2, where it operates relay BP and holds relay B operated. The operation of relay BP connects battery from contact 1 of relay C, through contact 1 of relay BP, through normal contact 3 of relay D, through the lamp Ready, to ground. The lighting of lamp Ready is a signal for the subscriber to begin dialing. The subscriber dials a number assigned to the stock in question, and the operation of the dial interrupts the current flowing over line B, thereby releasing relay B in the selector, Fig. 5, a number of times equal to the digit dialed. The dial in operating closes an off normal contact which connects ground from the off normal contact designated ON, through the normal contact 4 of relay D, and through rectifiers bn and bp in parallel to the windings of relays BN and BP, to ground, and short-circuits the line relays BN and BP which would interfere with the pulsing.

Let us suppose that the first digit of the stock number is 4. When relay B releases, ground through the normal contact 3 of relay K, from the contact 3 of relay B, is momentarily removed from the winding of relay G but relay G being "slow release" does not fall back. The release of relay B closes a path for ground from the normal contact 2 of relay H, through contact 1 of relay G, through the normal contact 1 of relay B, through the normal contacts 1 and 3 of relays N, P and Q, to the winding of relay 1 which operates. At the end of the first pulse the operating path for relay 1 is opened due to the reoperation of relay B, but relay 1 locks up through its own contact through the winding of relay N, through the normal contact 2 of relay P, through the contact 1 of relay G, through the normal contact 2 of relay H, to ground, operating relay N. The operation of relay N transfers the path of ground from the normal contact 2 of relay H, through the contact 1 of relay G, through the normal contact 1 of relay B, etc., to the winding of relay 2.

When relay B released, a path was also closed through the winding of relay F, through the normal contact 1 of relays Q, P and N, through the normal contact 1 of relay B, through the contact 1 of relay G, through the normal contact 2 of relay H, to ground. This operated the slow-to-release relay F. The operation of relay F closed a path through its own contact 3 for the reception of further pulses each time that relay B released. This path is through the winding of relay F, through contact 3 of relay F, through the normal contact 1 of relay B, through contact 1 of relay G, through the normal contact 2 of relay H, to ground. Consequently, the next pulse following the path previously described now comes through the make contact 3 of relay N, through the contact of relay 1 to the winding of relay 2.

The operation of relay 2 closes a locking path for itself through the winding of relay P so that upon reoperation of relay B, relay 2 locks in series with relay P through the normal contact 2 of relay Q, through the contact 1 of relay G, through the normal contact 2 of relay H, to ground. The operation of relay P switches the path of the next pulse to relay 3 and also releases relays N and 1. The next two pulses serve to operate respectively relay 3 which locks up in series with relay Q, and relay 4 which locks up in series with relay N. The operation of these relays is similar to that described for relays 1 and 2. At the end of the fourth pulse relay 4 locks up in series with relay N releasing relays 3 and Q.

At the end of four pulses (the first digit being 4) relay F, which held up during the pulsing, releases. This closes a circuit through the winding of relay E, through the normal contact 1 of relay F, through a contact of relay 4, over line 1, to the winding of relay G10, Fig. 7, through the normal contact 3 of relay G10, through the normal contact 1 of relay GR, through the normal contacts 1 of relays G90 to G10, to ground. G10, therefore, operates in series with relay E and opens the operating and holding circuits for the other relays of this group to prevent double connections.

The operation of relay E connects ground through contact 3 of relay E, through a contact of relay 4, over line 2, through the winding of GO, Fig. 7, through a normal contact 3 of GO, through a normal contact 3 of GR, through normal contacts 1 of G9 to GO, through the winding of GS relay, to battery which operates relays GS and GO. As relay GO operates it opens the operating and holding circuits for the other relays G1 to G9 of this group to prevent double connections. The operation of relay GS connects ground through contact 3 of relay GS, through the normal contact of the busy key BK, through the normal contact 1 of relay A, over line 6, through the winding of relay S, Fig. 6, in the selector finder to battery. The operation of relay S closes a path for ground from contact 2 of relay G10, over line 1, through a contact of relay S, to the winding of relay F10 to battery, operating F10. The operation of relay S also closes a path for ground from make contact 2 of relay GO, over line 4, through a contact of relay S, to the winding of relay FO to battery, operating relay FO. The operation of relays F10 and FO connects the leads A, B and C of the selector, through to a register, Fig. 8. The operation of relay S connects ground over line 8 and operates relay GR, Fig. 7, preventing further operation of the guard relays by opening the normal contacts 1 and 3 of relay GR, relays G10 and GO having locked up through their own contacts 3. The operation of relay GR also connects ground through the contact 2 of relay GR to the call meter CM which records the number of calls.

Upon operation of the S relay in the selector finder, Fig. 6, ground is placed upon lead B to the register which operates the B relay in the register, Fig. 8, over a path from the coil of relay B, through the normal contact 1 of relay J and normal contact 3 of relay K, over line B, through a contact of the S relay, to ground. Relays BN and BP, Fig. 2, are again short-circuited and BP releases, extinguishing the Ready light. The operation of relay B operates relay G through contact 1 and lights the RL lamp. Relay G connects ground through contact 2 to lead D which holds relays F10 and FO operated through their own contacts when the relays in the selector release, which occurs when battery from the normal contact 3 of relay W, through make contact 3 of relay B, operates relay C which locks up over contact 1 of relay C, lights the BL lamp and places ground upon lead C through make contact 3 of relay C and operates relay K, Fig. 5. The operating path of relay K from the ground on lead C is through the contacts of relays FO and F10.

The operation of relay K, Fig. 5, operates relay H, and also releases relay B allowing relays 4 and N, Fig. 5, and G10 and GO, Fig. 7, to release.

GS being in series with GO also releases. The release of relay GS releases relay S, Fig. 6. The release of relay S removes ground from relay GR, Fig. 7, releasing it. The release of relay S also removes the short-circuit from the windings of relays BN and BP, Fig. 2, and A, Fig. 7, permitting A to operate from battery, through resistance, through the winding of relay A, over line 9, to ground on lead C, Fig. 6, from the register, Fig. 8. BP reoperates in series with relay B, Fig. 8. The operation of relay A switches the next incoming call to the next idle selector finder. Throughout the duration of the call the following relays remain operated: relays K and H in the selector and relays F10 and F0 in the selector finder and guard relay A.

Figure 3:
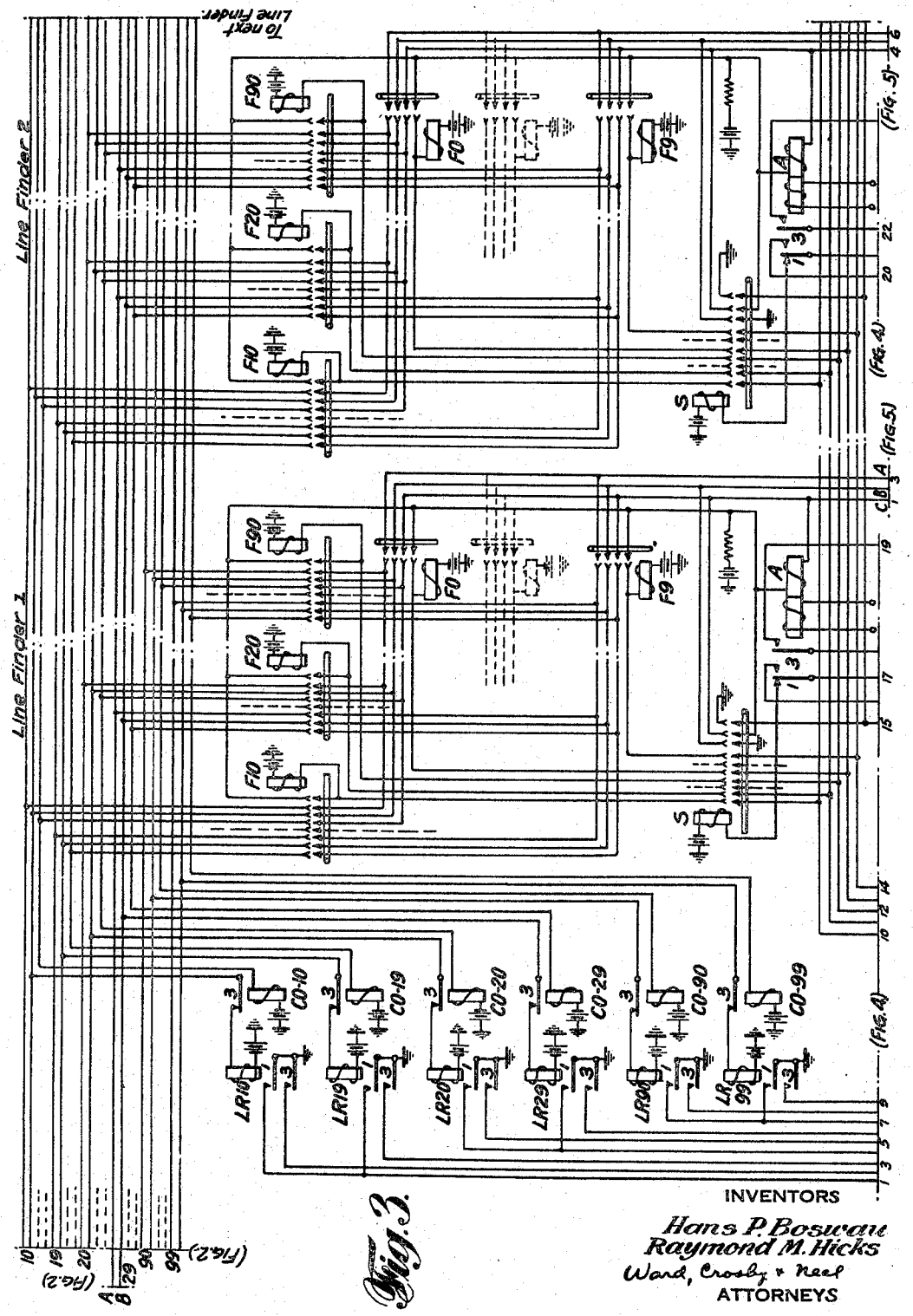
Fig. 3 shows the equipment located at each wire center for connecting subscribers' lines through to trunks, and includes the line relays and line finders.
Figure 4:
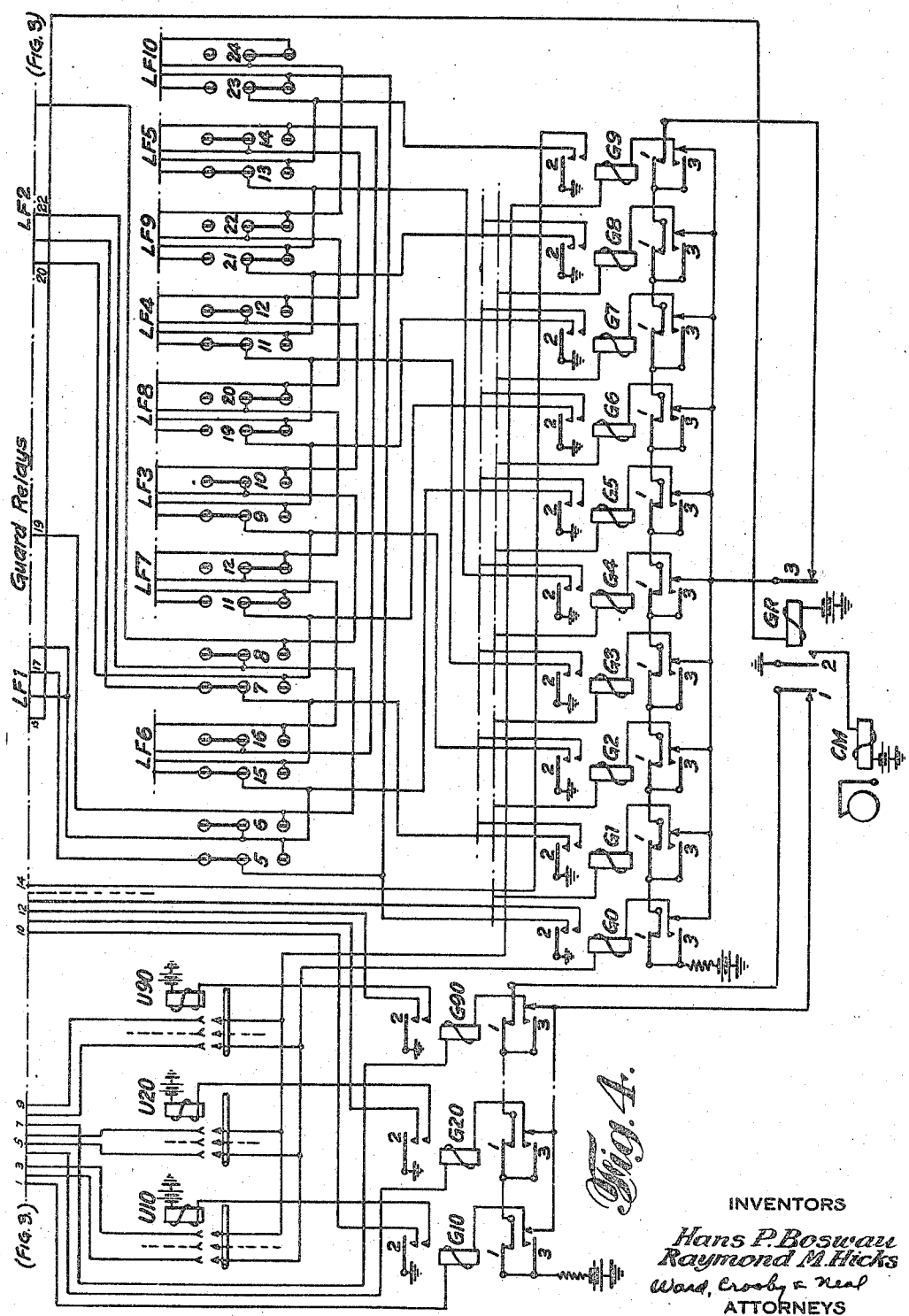
Fig. 4 shows the guard circuit located at the wire center.

The next three digits dialed by the subscriber open the line current flowing through the winding of relay B, Fig. 8, through the normal contact 1 of relay J, through the normal contact 3 of relay K, over lead B, through the contacts of relays F0 and F10 in the selector finder, Fig. 6, through make contact 2 of relay K in the selector, Fig. 5, through the contacts of relays F9 and F21 in the line finder, Fig. 3, through contact 4 of relay C, Fig. 2, dial contact P, through the dial contacts, through the rectifier $bn$ and winding of relay BN, to ground.

Each time the line current is interrupted by the dial, the B relay, Fig. 8, releases. However, the G relay being "slow release" holds up. Battery through the normal contact 3 of relay W, through the normal contact 3 of relay B, through make contact 1 of relay G, through the normal contact 3 of relay U, through the normal contact 2 of relay T, operates the indicator unit HS once for each pulse during the train of pulses. Ground through the normal contact 1 of relay B, through the make contact 3 of relay G holds relay F, which is "slow release", operated. When relay F operates battery through make contact 3 of relay F, through normal contact 1 of relay U, through the normal contact 1 of relay T, through the winding of relay H, through contact 2 of relay G, to ground, through the normal contact 3 of relay H, operates relay R. When the pulses cease relay F falls back opening the operating path of relay H which then locks in series with relay T, the path being through the winding of relay H, through winding 1 of relay T, through make contact 1 of relay H, to battery, through resistance and the normal contact 3 of relay F.

The operation of relay T transfers the indicator operating path from the HS indicator to the TS indicator, the path for the next train of pulses being from battery through the normal contact 3 of relay W, through the normal contact of relay B, through the make contact 1 of relay G, through the normal contact 3 of relay U, through make contact 2 of relay T, to the TS indicator. Relay F again operates on the next train of pulses and in turn holds relay T operated through make contact 1 of relay T, through winding 2 of relay T, through contact 2 of relay G, to ground, on normal contact 3 of relay RLS—1. When relay F operates it removes the locking path for relay H which is through winding 1 of relay T, releasing relay H. When the pulses cease, relay F releases opening the operating path for winding 2 of relay T which then locks up in series with winding 1 of relay U. The operation of relay U transfers the indicator operating path at its contact 3 to indicator US. The third train of pulses (the fourth digit dialed) operates the US indicator.

At the end of this train of pulses relay F once again releases and relay U holds up in series with the winding of the W relay, the circuit being battery through the normal contact 3 of relay F, through the normal contacts 1 and 3 of relays H and T, through contact 2 of relay U, through winding 2 of relay U, through the winding of relay W, through contact 2 of relay G, through contact 3 of relay R, to ground.

The operation of relay W closes a circuit for negative signal battery through a resistance to contact 1 of relay W, through the normal contact 2 of relay S, through the normal contact 2 of relay J, through the normal contact 1 of relay K, through a resistance to line A, through the selector finder, through the line finder, through rectifier $an$, subscriber's line relay AN, to ground. The operation of subscriber's relay AN connects battery from contact 1 of relay C, through contact 1 of relay AN, through the normal contact 1 of relay B, through winding of relay A to ground. Relay A operates.

The operation of relay A closes a path from battery at contact 1 of relay C through normal contact 3 of relay B, through contact 2 of relay AN, through normal contact 1 and winding of relay 4, operating relay 4. Relay 4 locks from battery over make contact 1 of relay C, contact 2 of relay A, make contact 1 of relay 4 through winding of relay 4 to ground. Relay 3 operates from battery through contact 1 of relay C, through contact 1 of relay AN, through contact 3 of relay A, normal contact 1 of relay D, through the winding of relay 3 to ground. Relay 3 locks from battery over contact 1 of relay C, contact 2 of relay A, contact 1 and winding of relay 3 to ground. Relay 2 operates from battery over contact 1 of relay C, through contact 1 of relay AN, contact 3 of relay A, break contact 1 of relay D, relay 2 winding to ground. Relay 2 locks from battery at the make contact 1 of relay C, through contact 2 of relay A, make contact 1 of relay 2 and winding of relay 2 to ground. D relay operates from battery at contact 1 of relay C to the winding of relay D, make contact 3 of relay 4, make contact 3 of relay 3, make contact 3 of relay 2 to ground. The operation of relay D extinguishes the Ready lamp. Relay D locks from battery at contact 1 of relay C to the winding of relay D through make contact 2 of relay D to ground. Relay 1 operates from battery of contact 1 of relay C, normal contact 3 of relay B, contact 2 of relay BP to the normal contact 1 of relay 1, winding of relay 1, through make contact 3 of relay 4, and make contact 3 of relay 3 over contact 3 of relay 2 to ground. Relay 1 locks over a circuit from battery through contact 1 of relay C, contact 2 of relay A, through make contact 1 and winding of relay 1 and through make contact 2 of relay D to ground.

When negative battery is removed from line A and positive battery from line B, the AN and BP relays release. The release of relay AN removes a shunt from the winding of relay B which operates and locks in series with relay A over the following circuit: Battery at contact 1 of relay C through the winding 1 of relay B, over contact 4 of relay A and the winding of relay A to ground. The equipment located at the subscriber's office or station is now ready for pulses from the wipe-out sender.

The operation of the relay W in the register, Fig. 8, prepares the operating path of relay L from battery through make contact 3 of relay W to the winding of relay L, but relay L does not operate immediately as the circuit is not complete. The operation of relay W also removes battery at normal contact 3 from the indicator pulsing path. The operation of relay W at its contact 2 connects ground over the ST lead to the wipe-out sender, Fig. 9. Ground on the ST lead lights the BL lamp and energizes relay A in the wipe-out sender when cam 1 closes the contact springs associated with it. The path for the operation of the A relay is through the cam springs, through the normal contacts 3 of relays B, 1, 2, 3, 4 and 5 to the winding of relay A. When the cam contacts open, relay B operates in series with relay A, the path being through contact 3 of relay A, through winding 1 of relay B, through the normal contacts 1 of relays 1, 2, 3, 4, 5 and RA, through a resistance to ground on the ST lead. The operation of relay B also connects ground from the normal contact 2 of relay 1, through contact 4 of relay B, through contact 2 of relay A, over the PU lead, through the normal contact 4 of the relay S in the register, Fig. 8, to the winding of relay L which operates to battery on make contact 3 of relay W. The operation of relay L connects ground from contact 3 of relay C through contact 1 of the L relay to the winding of relay J which operates.

The operation of relay J disconnects the B relay from the line B, opens the path of negative signal battery supply through contact 1 of relay W and closes a holding circuit for relay G through contact 3 of relay J and normal contact 3 of relay S to ground at make contact 3 of relay C. Relay F operates from ground on normal contact 1 of relay B, through make contact 3 of relay G. The removal of negative battery from line A, due to the operation of the relay J, releases the AN relay in the subscriber's equipment, Fig. 2. The release of the AN relay permits relay B to operate in series with relay A, as described.

The operation of relay B, Fig. 9, closed a circuit through its contact 1 to operate relay C from ground on the ST lead through the normal contact 1 of relay RC. The operation of relay C closes a path for the operation of relay D through its contact 2 but relay D is short-circuited by the spring contacts of cam 5 until these contacts open.

The operation of relay J, Fig. 8, connects incoming line A through contact 2 of relay J over lead A to the contacts of cam 6 and incoming line B through resistance to the contacts of cam 7 through contact 1 of relay J. When cam 1 in Fig. 9 closes, relay 1 operates over a circuit from the winding 1 of relay 1, through the winding of relay B, through the make contact 3 of relay B, through closed contacts of cam 1 and through the make contact 2 of relay W. The operation of relay 1 releases the relay A by opening the locking circuit for relay A at the normal contact 1 of relay 1. The relay L of Fig. 8 releases due to the removal of ground from the normal contact 2 of relay 1. Relays U and W in the register circuit remain operated over the following circuit: Battery through resistance at the operated contact 3 of relay F to the operated contact 1 of relay U, through the winding 2 of relay U, winding of relay W, make contact 2 of relay G and through contact 4 of relay W—1 to ground. Relay WO operates from negative battery through the winding of WO, normal contact 3 of relay L, make contact 3 of relay J, normal contact 3 of relay S and through make contact 3 of relay C to ground. Relay J locks over a circuit through make contact 3 of relay J, normal contact 3 of relay S and through make contact 3 of relay C to ground.

When cam 1 opens, the B relay in the wipe-out sender releases, but relay 1 remains operated over a circuit through winding 1 of relay 1, through make contact 1 of relay 1 to normal contacts 1 of relays 2, 3, 4, 5 and RA, through resistance over the ST lead and through the operated contact 2 of relay W to ground. The release of relay B also connects negative signal battery through the normal contact 1 of relay RB, contact 2 of relay B, contact 3 of relay C to contacts of cams 6 and 7 so that the first pulses sent out on leads A and B will be negative pulses. Relay C in Fig. 9 remains operated over the following circuit: Battery through the winding of the C relay in the wipe-out sender, through normal contact 1 of relay D, through the closed contacts of cam 5, through contact 2 of relay C and through the contact 1 of relay RC over the ST lead to ground at the make contact 2 of relay W.

As soon as cam 5 opens its contacts relay D operates in series with relay C and connects positive signal battery to the contacts of cams 6 and 7. Positive and negative pulses are then sent alternately on lines A and B. These positive and negative pulses operate the line relays AN, AP, BN, BP, Fig. 2, in pairs, AN and BN operating simultaneously, and AP and BP operating simultaneously.

The operation of relays 1, 2, 3 and 4 in the subscriber's equipment, Fig. 2, connected battery to the contacts 3, 4, 5 and 6 of relays AN, AP, BN and BP. The pulsing of these relays now blanks out the indicators of the subscriber's display unit, there being no actuating ground connected to these indicators due to contact 2 of relays 1, 2, 3 and 4 being open. The restoration ground is normally applied whenever the indicators are out of normal home position, the construction being such that this ground is removed as is well known, by a cam as the indicator moves into normal position, for example, as shown in the patent to Frischknecht, No. 2,052,539, issued August 25, 1936. The first pulse from contact 1 of relay AN connected battery through make contact 1 of relay B, through make contact 1 of relay A, to the winding of relay A to ground. The windings of relay A oppose each other so that the first pulse knocks down relay A, relay B being "slow release" still holds up. Succeeding pulses from contact 1 of relay AN hold relay B operated through make contact 1 of relay B, and through the normal contact 1 of relay A, to winding 2 of relay B.

Referring to the wipe-out sender, Fig. 9, cams 6 and 7 continue to send negative and positive pulses on lines A and B while cam 1 continues to send pulses to the counting chain in the wipe-out sender. The next pulse from cam 1 operates relay 2 in series with winding 2 of relay 1. The operation of relay 2 releases relay 1 when cam 1 opens. Succeeding pulses from cam 1 operate relays 3, 4 and 5 successively. It will be noted that cam 1 has only one high point, while the other cams have two high points. This results in the other cams generating twice as many pulses as cam 1, so that it is only necessary to count off five pulses from cam 1 to insure that ten pulses have been sent out by the other cams, no line impulses being transmitted during the first pulse. In actual operation cam 1 counts off six pulses at the end of which relay 5 is held up through its own winding 1 and contact 1 through the normal contact 1 of relay RA, through a resistance to ground on the ST lead.

At the beginning of the seventh pulse from cam 1, relay RA operates in series with winding 2 of relay 5. The operation of relay RA operates relay RB over its contact 1 to the ST lead, and relay RB locks up through contact 3 on RB of contact 1 of relay A to ground on the ST lead. The operation of relay RB prepares for removal of the negative signal battery from the contacts of cams 6 and 7. At the end of the seventh pulse, relays RA and 5 release closing the circuit through the normal contact 3 of relay RA, contact 3 of relay RB and normal contact 1 of relay A, to operate relay RC from ground on the ST lead. The operation of relay RC removes the ground which previously held relays C and D locked up. However, until cam 5 opens its contacts ground is supplied to hold relays C and D operated. This insures that the last positive pulse will be completely transmitted before relays C and D release, disconnecting the positive signal battery from the contacts of cams 6 and 7. The negative signal battery was removed from the contacts of cams 6 and 7 with the release of relay RA since this battery was supplied through contact 2 of relay RA, after relay RB operated. At the end of the cycle ten positive and ten negative pulses have been sent out by the wipe-out sender on lines A and B.

When relay B, Fig. 2, releases at the end of wipe-out pulses, relays 1, 2, 3 and 4 release due to their locking circuit being opened at make contact 3 of relay B. Relay W in Fig. 8 still being operated continues to hold ground on the ST lead to the wipe-out sender so that upon the next closure of cam 1 following the release of relays C and D as previously described, relay A will again operate and when cam 1 opens, relay B will operate. Relay A in operating opens contact 1 releasing relay RC. With relays A and B operated, a path is closed for operating relay L in Fig. 8 over the lead PU. Relay S in Fig. 8 operates in series with relay WO through contact 1 of relay WO and make contacts 3 and 1 of relay L, make contact 3 of relay C to ground. Relay S at contact 4 opens the circuit to relay L, which releases. Relay L in releasing opens contact 1 releasing relay J. Relay S remains locked through its make contact 3 to ground through make contact 3 of relay C but relay WO releases. The release of relay J disconnects lines A and B from the wipe-out sender and connects lead B through break contact 1 of relay J to positive signal battery, through the winding of relay B which operates holding relay G and releasing relay F.

Relay BP in the subscriber's equipment operates on this circuit and establishes a path for operating relay A through the normal contact 1 of relay B and make contact 3 of relay D, make contact 1 of relay BP, and contact 1 of relay C to battery. Relay 1 operates over the following circuit: ground on make contact 2 of relay D through winding and normal contact 1 of relay 1, contact 2 of relay BP through normal contact 3 of relay B to battery on contact 1 of relay C. Relay 1 locks through its make contact 1 and contact 2 of relay A to contact 1 of relay C to battery.

The operation of relay S lights the lamp GL indicating to the operator that wipe-out has been completed and the regular transmission may proceed. The wipe-out sender is kept in operation by ground on the ST lead from make contact 2 of relay W in preparation for blanking out the operator's indicators associated with the register. These conditions hold until the operator by depressing the start key operates relay K.

Figure 11:
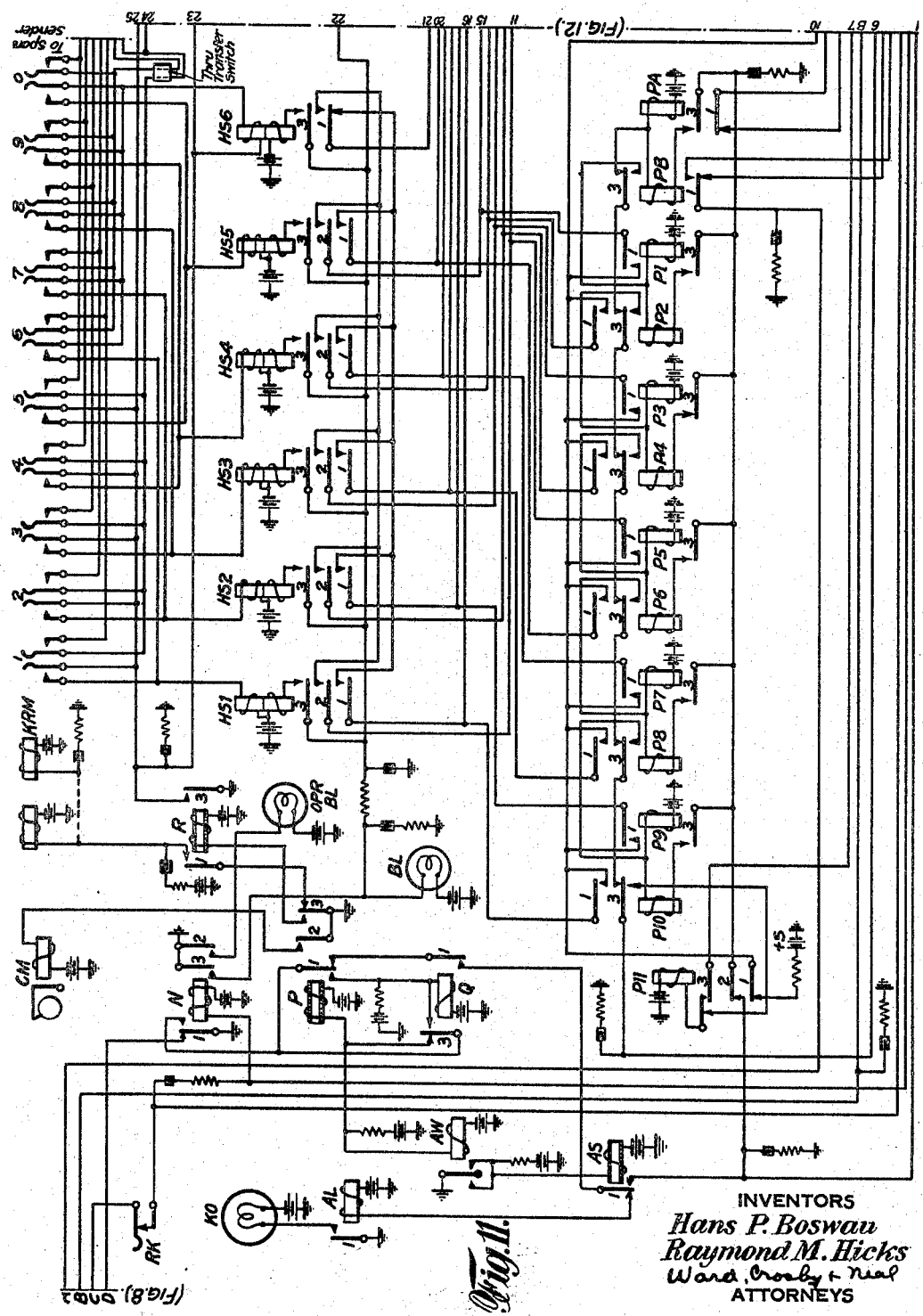
Figure 12:
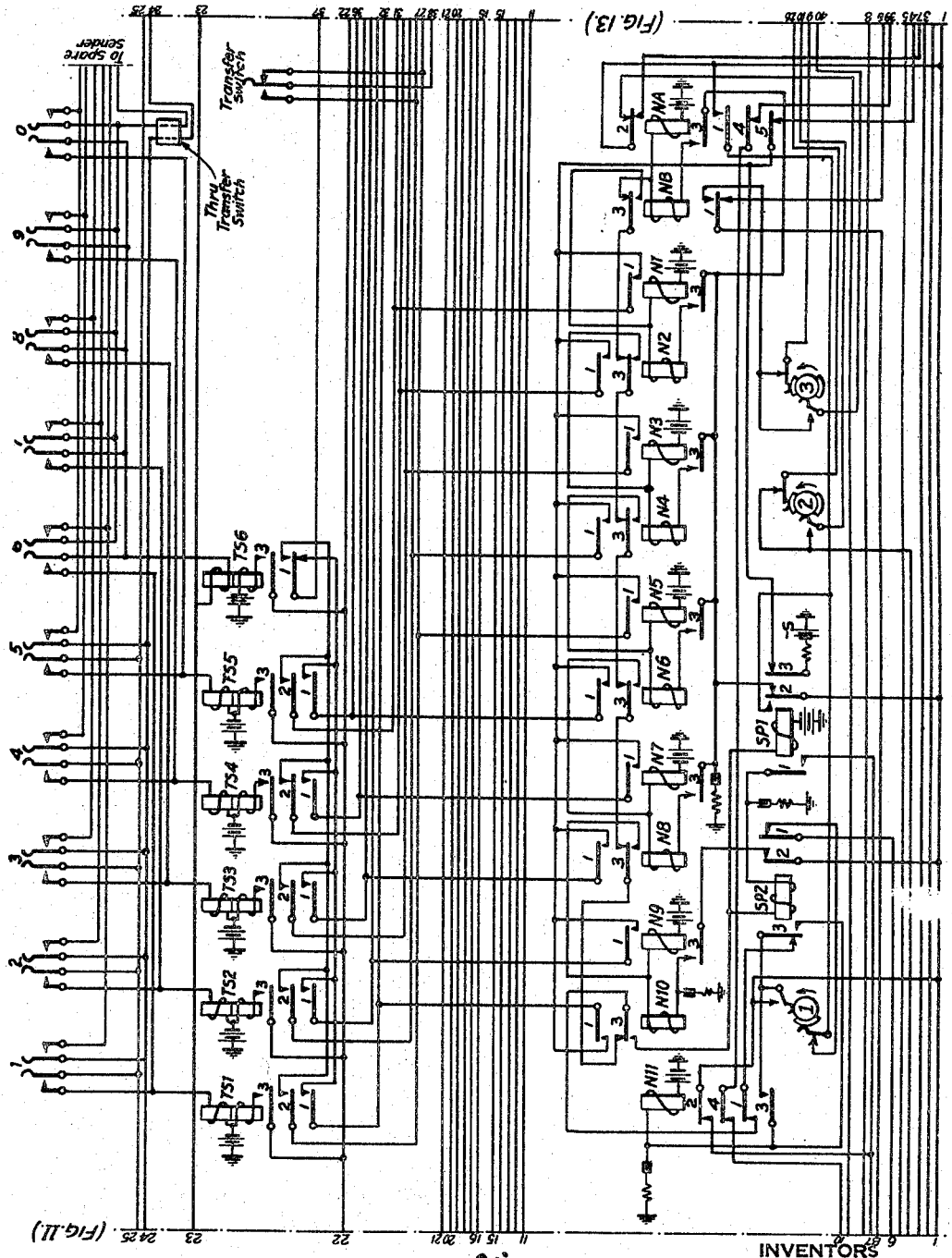
Figure 13:
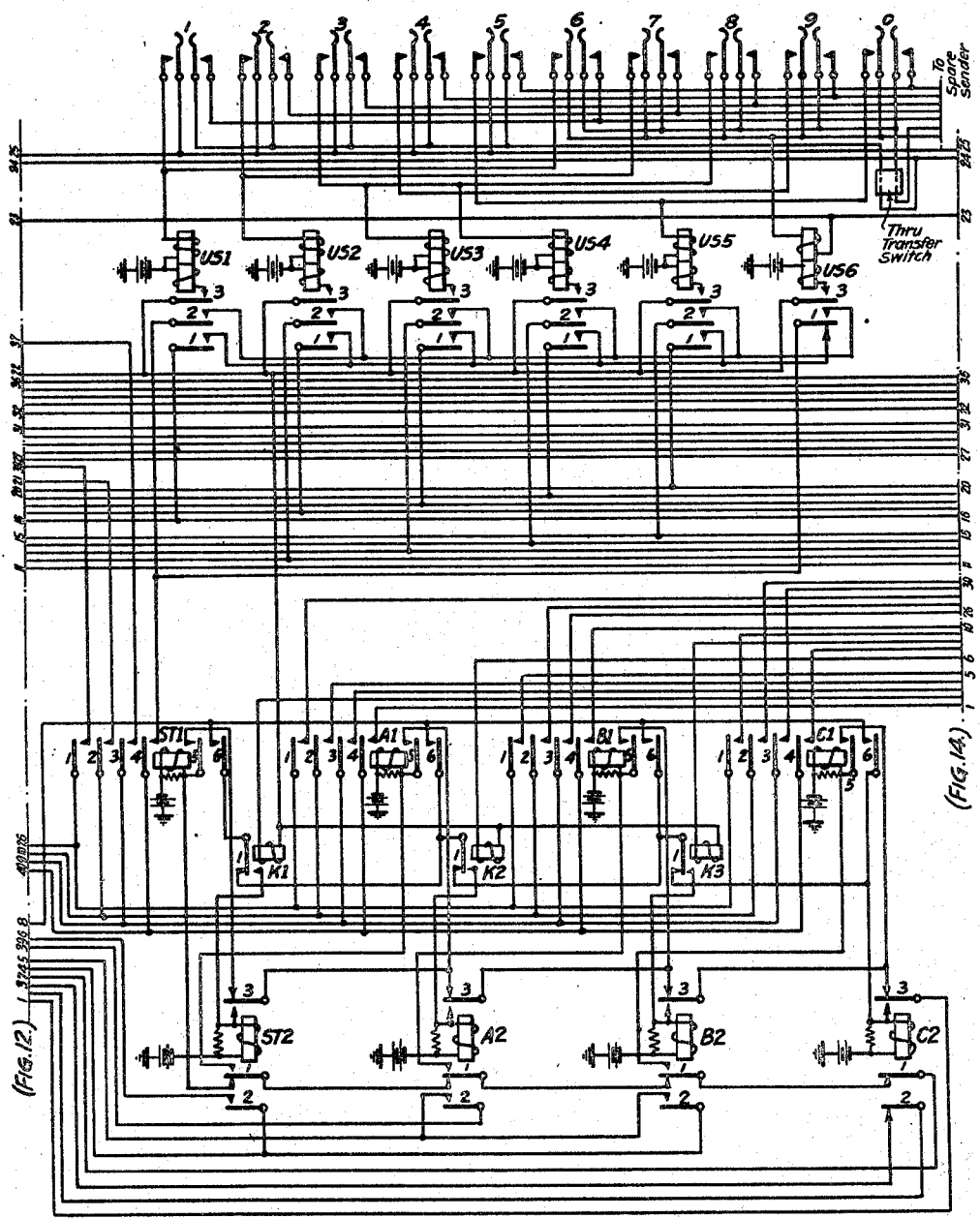
Figure 14:
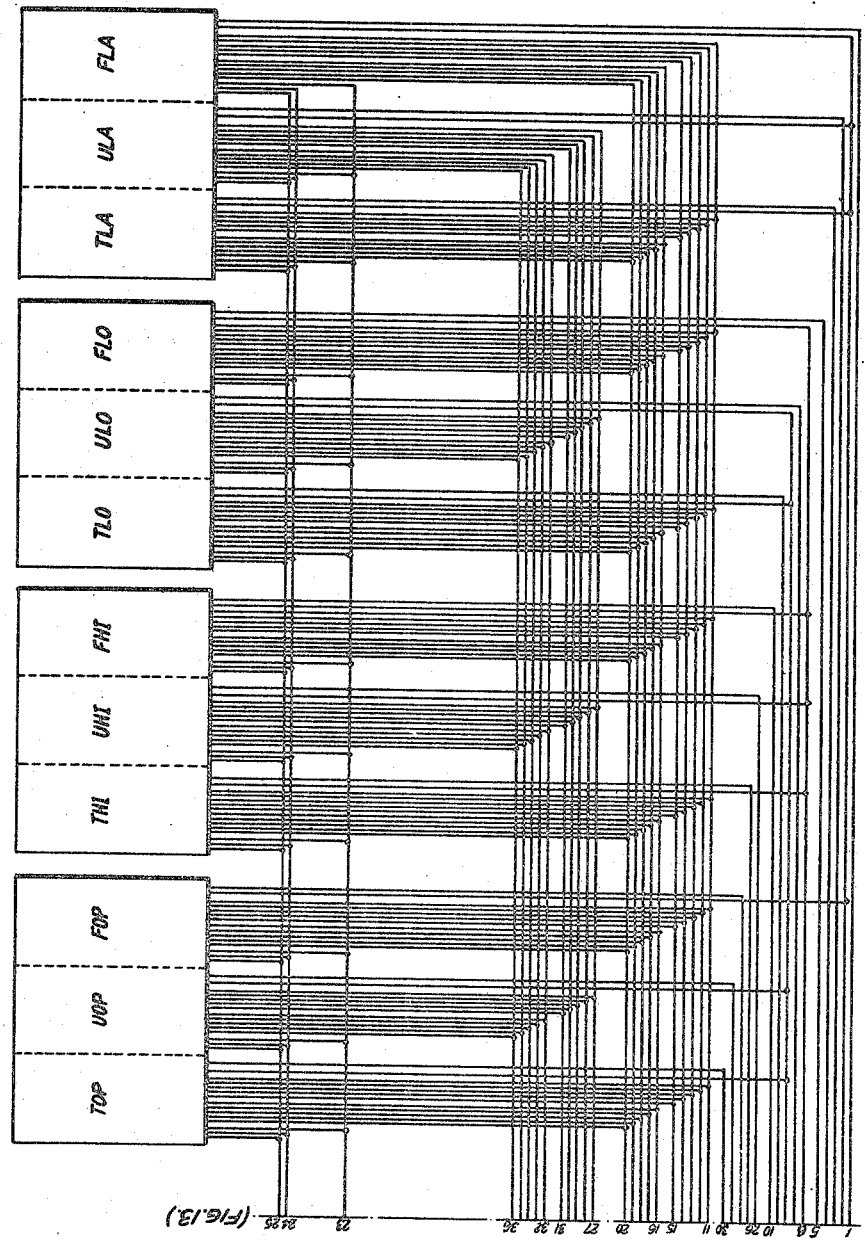

During the wipe-out period the operator may have depressed one key in each of one or more of the strips of keys shown in Figs. 11, 12, 13 and 14. The first three key strips HS, TS and US in Figs. 11, 12 and 13 represent respectively the hundreds, tens and units digits of the stock number; the thousands digit is sent automatically since not more than one thousand stocks are assigned to each operator. In addition, the operator has four groups, Fig. 14, of three key strips each, upon which she may write the tens, units and fractions digits of the "open", "high", "low" and "last" prices of the stock in question. These strips are designated TOP, UOP, FOP; THI, UHI, FHI; TLO, ULO, FLO; and TLA, ULA and FLA. The operator upon seeing the green light associated with the register by means of which the request for this stock was received, depresses the start key of that register. This is the key SK shown in the register, Fig. 8. The start key closes a circuit from battery on the winding of relay N in the sender, Fig. 11, over lead 2 to Fig. 12, over lead 2 to Fig. 13, through normal contact 2 of relay C2, over lead 3 to Fig. 12, over lead 3 to Fig. 11, through key RK, over lead C to Fig. 8, through the winding of relay K, through the contact 5 of relay S, through start key SK, over lead D, to ground through the normal contact on relay N, Fig. 11. This operates relay K in series with relay N, both relays locking up from ground on contact 2 of relay K.

The operation of relay K disconnects the B relay in the register, Fig. 8, from the line B, and relay B releases, releasing relay G. The release of relay G closes a circuit for the operation of relay D in the register over the lead PU from the wipe-out sender. Meanwhile, the wipe-out sender has been sending out pulses. The next pulse coming over the PU lead passes through winding 1 of relay D in the register, Fig. 8, through contact 2 of relay C, through the normal contact 1 of relay G, through the normal contact 3 of relay B, to battery on the normal contact 3 of relay W which together with relay U has released due to the release of relay G, removing ground from relay W. Relay D operates locking up through its winding 2 in series with relay E to battery on contact 1 of relay C. The operation of relay E at its contacts 1, 2 and 3 connects the three indicators of the register to the lines US, TS and HS leading to the contacts of the pulsing cams 9, 10 and 11, Fig. 9, and the operation of relay D, Fig. 8, at its contact 2 removed the actuating ground from the line AG coming from the indicators. The next train of ten pulses generated by cams 9, 10 and 11, Fig. 9, blanks out the indicators. Ground is removed from lead AG at contact 2 of relay D, so that indicators HS, TS and US will remain in the blank position.

At the end of the train of ten pulses relay RC in the wipe-out sender, Fig. 9, operating as described above, sends out ground over its contact 3 on the RL lead which knocks down differentially wound relay C in the register, the path being through contact 1 of the D relay. When relay C releases the light RL is extinguished and relays D and E release disconnecting the indicators from the wipe-out sender. The release of relay C also removes the starting ground from the wipe-out sender, since, after the release of relay W, the starting ground was furnished through the normal contact 1 of relay B, through the normal contact 3 of relay G, and through contact 4 of relay C. Consequently, the wipe-out sender, unless being used by some other register, ceases operation. Relay K holds ground on the C and D leads to the selector finder holding up the selection relays therein. Relay K also holds ground on the winding of relay S, through make contact 2 of relay K, normal contact 3 of relay C at make contact 3 of relay S. During transmission from the operator's sender relays K and S in the register remain operated; all other relays in the register are released.

Referring to the operator's sender, Fig. 11, the operation of relay N operates the busy lamp through contact 3, and connects ground through contact 1 of relay N, through the normal contact 3 of relay Q to operate relays P and AW in parallel. Relay AW in operating operates relay AS. The P relay in operating also operates the Q relay. The Q relay locks up through its contact 3 to ground on make contact 1 of the N relay, thereby releasing the P relay. The operation of the Q relay releases relay AW which, however, is of the pendulum type and vibrates for a period greater than any normal transmission time so that relay AS is held, provided the time of transmission is not much greater than normal.

The release of relay P connects ground from contact 1 of relay N, through the normal contact 1 of relay P, through contact 1 of relay Q, through make contact 1 of relay AS, over lead 1, through the top springs of cam 1, Fig. 12, through the normal contact 3 of relay SP2, the normal contact 1 of relay N11 and the normal contacts 3 of relays N10, N8, N6, N4, N2 and NB to the winding of relay NA which operates. This starts the negative counting chain. As soon as relay NA operates, it connects ground from the N relay on lead 1 through its contact 1 to the side springs of cam 1. When the side springs of cam 1 close, ground is connected through contact 1 of relay SP2 over lead 6, through the normal contacts 3 of relays P10, P8, P6, P4, P2 and PB to operate relay PA, Fig. 11, thereby starting the positive counting chain. Meanwhile, the ground from contact 3 of relay P during the momentary operation of relay P has operated relay R, and relay R through its contact 3 and through the particular keys operated has energized the windings of certain of the storage relays designated HS—, TS—, TOP, UOP, etc.

It should be noted that for digits above 5, relay 6 in the storage group operates in series with one of the other relays in the group. For example, if key HS—6 has been depressed, the path in this case is ground from contact 3 of relay R, through the winding of relay HS6, through the contact of key 6, through the winding of relay HS1, to battery. Ground from contact 3 of relay N has locked the various storage relays, previously operated, through their own contacts 3. The release of relay P, as described above, releases relay R but due to the fact that relay R is "slow release" a momentary circuit is closed through the normal contact 3 of relay P, through contact 1 of relay R, to the key release magnets KRM, thereby releasing the keys depressed by the operator, but the storage relays retain the information set up.

Since both relay P and relay R have released, the operator may set up a new quotation without affecting the storage relays.

When relay NA, Fig. 12, operates, it connects ground through contact 2, over lead 7, through the normal contacts 1 of relays C2, B2, A2 and ST2, Fig. 13, to operate relay ST1 which connects contact 1 of HS6, contact 1 of TS6, contact 1 of US6, and the terminal designated ST, (under the "transfer switch", SW), through contacts 1, 2, 3 and 4 of relay ST1 to the feeder springs of the cams 2 and 3, Fig. 12, which generate the line pulses. Pulses from the springs on cam 1 cause both the negative and positive counting chains to count. The relays in the chains remain locked through their contacts 3 and through the normal contacts of relays SP1 and P11 to the ground on relay N, contact 1.

Negative battery is supplied to the top springs of cams 2 and 3 as follows: normal contact 3 of relay SP1, make contact 1 of one of the NEG counting relays, contacts of storage relays, contacts 1 and 3 of relay ST1, to the cam springs. Positive battery is supplied to the side springs of cams 2 and 3 as follows: contact 1 of relay P11, contact 1 of one of the POS counting relays, contacts of storage relays, contacts 2 and 4 of relay ST1 to side cam springs of cams 2 and 3.

The battery supplied to the contacts of cams 2 and 3 is fed through the normal contacts on N11 and SP1 to the contacts 1 of counting relays N1 to N10 and P1 to P10, respectively. As the counting progresses, battery is connected through the contacts 1 to the contacts on the storage relays and through the contacts of the storage relays and the relay ST1, the battery is fed to cams 2 and 3. For example, if we wish to transmit three pulses for the tens stock number, the operator will have depressed key TS3 and relay TS3 will be locked up. It may be seen that no battery will be supplied to the top spring on cam 3 until relay N8 operates. After relay N8 operates battery will be held on the top spring of cam 3 until the counting chain completes one cycle. It will be seen that for a time equal to seven pulses no signal battery has been connected to the top spring of cam 3, and after the operation of N8 the top spring of cam 3 will be energized for a time equal to three pulses, thereby transmitting three pulses over line B as follows: battery circuit as described to top cam 3, through the cam springs, contact 1 of relay NB to line B. The pulses for line A are transmitted from the springs of cam 2 through contact of relay PB. The same operation is followed for the other digits of the stock number with the exception that no storage relays are furnished for the thousands stock number, the feeder or THS lead being connected permanently through a transfer switch to the contact 1 of the proper negative counting chain relay.

The pulse from the top springs of cam 1 following the pulse which operates relays N9 and N10, operates relay SP—1 as follows: ground from relay N over lead 1 through the top contact of cam 1, normal contact 3 of relay SP—2, contact 1 of relay N11, make contact 3 of relay N10, winding of relay SP—1 to battery. At the end of this pulse, relay SP—2 operates and locks in series with relay SP—1 through contact 2 of relay N11 to ground. The operation of relay SP—1 opens the negative signal battery feed at its contact 3 so that no additional negative pulses will be sent, and opens the locking circuit at its contact 2 for the negative counting relays NA—N8. These counting relays now release. Relay SP—2 in operating opens the locking circuit of counting relays N9 and N10 which release and at its make contact 3 prepares a circuit for the operation of relay N11, and at contact 1 of relay SP—2 opens the pulsing lead from side cam 1 to the positive counting chain. Since the last line pulse sent is always a positive pulse, the operation of relays SP—1 and SP—2 following the completion of a cycle of the negative chain, insures that sufficient time is provided for completing the count on the positive chain. The positive counting chain relays PA to P—10 locked in pairs through contact 2 of relay P11 to ground on lead 1. The pulse from the side springs of cam 1 following the operation of relays P9 and P10 operates relay P11 through make contact 3 of relay P10 and normal contact 3 of relay P11. Relay P11 locks over lead 7 through contact 2 of relay N11 to ground on lead 1. The operation of relay P11 releases counting relays PA to P10. The next closure of the top springs of cam 1 operates relay N11 over the path previously described. Relay N11 locks through its contact 3 and opens the locking circuit for relays SP—1 and SP2 at its contact 2 releasing them and opens the locking circuit for relay P11 which releases. When top cam 1 opens, relay N11 releases and both counting relay chains are again normal and the transmission of the stock number has been completed.

The locking circuits for the storage relays of the TLA, ULA, FLA and FOP groups are brought through the winding of relay K—1 so that when any relays of these groups are operated as previously described in accordance with the corresponding keys which had been depressed, relay K—1 was operated. In a similar manner relay K—2 was operated in series with the locking circuits of the storage relays of the THI, UHI, FHI and FLO groups; and relay K—3 is similarly associated with the locking circuits of the storage relays of the TLO, ULO, TOP and UOP groups.

Following the release of the counting chain relays as described above, relay ST—2 (Fig. 13) operates from battery through its winding, the make contact 1 of relay K—1, contact 6 of relay ST—1, contact 1 of relay PA (Fig. 11), break contact 2 of relay NA (Fig. 12), to ground on lead 1. The operation of ST—2 releases relay ST—1. Relay ST—2 locks through its make contact 3, normal contact 3 of relays A—2, B—2 and C—2, to ground on lead 1.

A switching pulse of negative battery over line B is now sent to the subscriber's equipment over the following path: negative battery through resistance, contact 3 of SP—1 (Fig. 12), contact 5 of relay NA, contact 2 of relay ST—2 (Fig. 13), break contact 1 of relay NB (Fig. 12) to line B.

The next closure of the top springs of cam 1 again operates relay NA as previously described and relay NA closes a circuit for operating relay A—1 (Fig. 13) through make contact 1 of ST—2 and normal contact 1 of relays A—2, B—2 and C—2 and make contact 2 of relay NA to ground on lead 1. The operation of relay NA also opens the circuit for the negative switching pulse on line B at its contact 5. The negative and positive counting chain relays now operate as previously described, except that during this cycle of operation of the counting chains, relays A—1 and ST—2 are operated instead of relay ST—1 which was operated during the previous cycle. Relay A—1 connects battery over paths previously described through the storage relays of groups TLA, ULA, FLA and FOP to the make springs of cams 2 and 3. Negative and positive pulses are now transmitted over lines A and B in accordance with the operated combinations of storage relays in the groups mentioned.

At the end of this cycle the counting chain relays release as at the end of the previous cycle and a circuit is closed for operating relay A—2 (Fig. 13) through make contact 1 of relay K—2, contact 6 of relay A—1, contact 1 of relay PA (Fig. 11), normal contact 2 of relay NA (Fig. 12), to ground on lead 1. Relay A—2 in operating, releases relays ST—2 and A—1 and locks through its make contact 3, break contact 3 of relays B—2 and C—2 to ground on lead 1.

A switching pulse of positive battery on line A is now sent to the subscriber's equipment over the following path: positive battery (Fig. 11), resistance, contact 1 of relay P—11, contact 4 of relay N—11 (Fig. 12), contact 4 of relay NA, contact 2 of relay A—2 (Fig. 13), break contact 1 of relay PB (Fig. 11) to line A.

Upon the next closure of the top spring of cam 1, the counting chains start a third cycle of operation and when relay NA operates as on the previous cycle, a circuit is closed for operating relay B—1 (Fig. 13) through make contact 1 of relay A—2, break contact 1 of relays B—2 and C—2, and make contact 2 of relay NA to ground on lead 1. The operation of relay NA also opens a circuit for the positive battery to line A ending the switching pulse. Relay B—1 locks through its own contact 5 and break contact 3 of relays B—2 and C—2 to ground on lead 1. The sender continues to repeat this cycle of operation of the negative and positive counting chains with relays A—2 and B—1 operated. Relay B—1 closes circuits for positive and negative battery through the contacts of operated storage relays in the FLO, THI, UHI and FHI groups to the make springs of cams 2 and 3, and as the counting chain operation continues this cycle, positive and negative pulses are sent out on lines A and B in accordance with the combinations of storage relays operated within these groups.

At the end of this cycle of the counting chains, the positive and negative counting relays release and a path is established for operating relay B—2 (Fig. 13) through make contact 1 of relay K—3 and contact 6 of relay B—1, contact 1 of relay PA, normal contact 2 of relay NA to ground on lead 1. Relay B—2 locks through its make contact 3, through break contact 3 of relay C—2 to ground on lead 1 and releases relays A—2 and B—1. A switch pulse consisting of negative battery over line A is now sent to the subscriber's equipment over the following circuit: negative battery (Fig. 12) through resistance, contact 3 of relay SP—1, contact 5 of relay NA, contact 2 of relay B—2, normal contact 1 of relay PB (Fig. 11), to line A.

The sender again repeats the cycle of operation of the positive and negative counting chains, the switch pulse ending as previously described with the operation of relay NA. The operation of relay NA also establishes a path for operating relay C—1 (Fig. 13) through make contact 1 of relay B—2, contact 1 of relay C—2, make contact 2 of relay NA to ground on lead 1. Relay C—1 locks through its contact 5, and normal contact 3 of relay C—2 to ground on lead 1. The cycle of operations of the positive and negative counting chains continues with relays B—2 and C—1 operated. Positive and negative battery are connected through operated storage relays in the groups TLO, ULO, TOP and UOP and the contact of relay C—1 to the make springs of cams 2 and 3 and positive and negative pulses are therefore sent out on lines A and B in accordance with the combinations of operated storage relays in these groups.

This last mentioned cycle completes the transmission of this stock quotation and when it ends, the sender is prepared to release and restore to normal as follows: When the counting chain relays release at the end of this last cycle, a path is established for operating relay C—2 (Fig. 13) through contact 6 of relay C—1, contact 1 of relay PA, and normal contact 2 of relay NA to ground on lead 1. Relay C—2 locks through its make contact 3 to ground on lead 1 and releases relays B—2 and C—1. Relay N which had been locked through normal contact 2 of relay C—2 now releases and by opening its contacts 1 and 3 removes locking ground from all operated relays in the sender except relay AS which, as previously described, is held operated to the vibrating contact of relay AW; which does not, however, prevent the starting of the sender on a new call.

During the above described operations of the sender the subscriber's equipment functions as follows: When the operator depressed the key SK operating relay N (Fig. 11) and relay K of Fig. 8 the positive signal battery was disconnected from line B by the opening of normal contact 3 of relay K. This causes the release of relay BP (Fig. 2). The release of relay BP establishes a path for operating relay B which locks in series with relay A, as previously described for the first operation of relay BP. When relay BP released the second time (preceding the reception of wipe-out pulses) relay 1 had been operated as previously described and supplied battery from contact 2 of relay B through its contact 3 to contacts 6 of relays BN, BP, AN and AP. When the stock number pulses transmitted over lines A and B from the sender as previously described are received, relays AN, AP, BN and BP operate and close circuits at their contacts 6 through resistance to the stock number indicators of the dial display unit. The release of relays 2, 3 and 4 supplies ground at their contacts 2 over lead AG to complete the circuit for the operation of the indicators from their blank position. The operation of relay AN when the first negative pulse is received over lead A, releases relay A as previously described for the reception of wipe-out pulses. At the end of the train of stock number pulses, relay B releases as previously described, releasing relay 1 at make contact 3 of relay B.

When the negative switching pulse is received on line B preceding the next transmission, relay BN operates, operating relay A over the following of relay A, normal contact 1 of relay B, through contact 1 of relay BN to battery on contact 1 of relay C. Relay 2 operates from battery over contact 1 of relay C, normal contact 3 of relay B, contact 2 of relay BN, through contact 1 and winding of relay 2 to ground. Relay 2 locks over the following circuit: Ground through the winding and make contact 1 of relay 2 to contact 2 of relay A and contact 1 of relay C to battery. At the end of the switch pulse relay BN releases, operating relay B which locks through relay A as previously described. Positive and negative pulses on lines A and B are now received corresponding to the price digits for last-tens, last-units, last-fractions, and open-fractions. Relays AN, AP, BN, BP operate on the line pulses and control the operation of the associated indicators through their contacts 5.

In a similar manner the third and fourth groups of line signals sent out by the transmitter are received by the relays AN, AP, BN and BP. A third series of line pulses controls the tens-high, units-high, fractions-high and fractions-low indicators of the dial display unit and a fourth, final series controls the tens-open, units-open, tens-low and units-low indicators. The positive switching pulse transmitted by the sender on line A prior to the third series of line pulses operates relay AP which in turn operates relay 3. The negative switching pulse transmitted by the sender on line A preceding the fourth series of pulses operates the AN relay which in turn operates relay 4. At the end of the final series of pulses, the subscriber's equipment awaits disconnection which is under control of another switching pulse from the central operating station. When the sender released as previously described, relay K (Fig. 8) which had been operated in series with relay N (Fig. 11) releases. The release of relay K releases relay S, leaving all relays in the register circuit normal and removes ground from leads C and D to the selector finder (Fig. 6) releasing relays FO and F—10 of Fig. 6 and relay K in Fig. 5. Relay K in releasing, opens the operating path to relay H but relay H is slow to release and holds its make contact closed for a short time after relay K has released, thereby connecting positive signal battery through resistance and contact 3 of relay H, break contact 1 of relay K to line A and negative signal battery through resistance, make contact 1 of relay H and break contact 2 of relay K to line B and the release of relay H restores all relays in the selector and selector finder to normal. The release of relay H removed ground from lead C to the line finder and extinguishes the busy lamp BL. The removal of ground from relay C releases relays A, F—9, F—20 and CO—29 in the line finder circuit Fig. 3, restoring this circuit to normal.

The negative signal battery over lead B and positive signal battery over lead A transmitted as just described operate relays AP and BN respectively in the subscriber equipment (Fig. 2). Relay AP in operating operates relay A over the following circuit: Ground through the winding of relay A, normal contact 1 of relay B, through contact 1 of relay AP and through contact 1 of relay C to battery. Relay 2 operates through the normal contact 1 of relay 2, contact 2 of relay BN, normal contact 3 of relay B, and make contact 1 of relay C to battery and locks through its make contact 1 to contact 2 of relay A to battery on contact 1 of relay C. Relay 3 operates from a circuit through the winding and break contact 1 of relay 3, contact 2 of relay AP, normal contact 3 of relay B to battery on contact 1 of relay C, and locks through contact 1 of relay 3, and through the contact 2 of relay A to battery on contact 1 of relay C. The operation of relays 2 and 3 closes a circuit from ground at contact 3 of relay 2 and the contact 3 of relay 3 and the normal contact 3 of relay 4 to the winding of C shunting and releasing the relay C. The release of relay C releases relays D, A, 2 and 3, restoring the dial set circuit to normal, relays AP and BN releasing at the end of the release pulse.

The equipment is then ready for the next call but it should be noted that in the selector finder, Fig. 7, relay A remains locked up through its contact 3 to ground on the normal contact 1 of the OVL relay. In this way the next call will come in on the second selector finder and register. Each succeeding call will come in on another selector finder until all selector finders and registers have been used. Under this condition all A relays will be locked up and a series circuit will be closed through contact 2 of each A relay connecting ground from contact 2 of the last A relay to the winding of the OVL relay. The operation of the OVL relay will release all A relays restoring the selector finder group to normal.

Referring to Fig. 7, a busy key BK is associated with each selector finder for the purpose of removing from service a selector finder with its associated register in case of trouble with the register equipment or for any other reason. The operation of any key BK closes the circuit from contact 2 of the associated A relay to contact 2 of the A relay of the next selector finder, thereby routing to the next selector finder a call which normally would select the selector finder in which the key BK was operated. In other words, the operation of key BK performs the same functions as the operation of relay A of the associated selector finder.

Associated with each selector, Fig. 5, is a busy key BK which, when operated, connects lead C directly to ground. This ground operates relay A, Fig. 3, so that a call, which would normally select this line finder and associated selector, will, instead, be transferred through the make contact 1 of relay A to the next idle line finder.

The following description traces the progress of a request for wipe-out which the subscriber originates by dialing zero instead of a stock number. Upon depression of the dial key the operations which occur are identical to those described for a normal call. The lamp Ready lights and the subscriber dials zero. The dialing of zero actuates the counting chain in the selector in a manner similar to that described for a normal call, but the final condition when dial pulses cease is that relay O is locked up in series with relay N in the selector. Guard relays G10 and GO, Fig. 7, are energized in the 0000 group and a selector finder in the 0000 group functions to connect the selector to a register. This register, however, differs from the normal operator's register and its operation will be described in detail.

As previously described for a normal call, the operation of relay S, Fig. 6, connects ground to lead B which in the wipe-out register, Fig. 10, operates relay B through the normal contacts 2 of relays J and RL. The operation of relay B operates relay G through contact 1 of relay B, and also connects negative signal battery through contact 3 of relay B, through the normal contacts 1 of relays RL and J, through resistance to line A. The negative signal battery connected to line A operates relay AN in the subscriber's equipment, Fig. 2, and positive signal battery through the winding of relay B to line B operates relay BP in Fig. 2. This condition provides the switch pulse indicating to the subscriber's equipment that wipe-out pulses are to be transmitted, and is the same as that previously described for a regular call terminating at an operator's register.

The operation of the subscriber's equipment is identical for both a wipe-out call and a normal call up to the completion of wipe-out. The operation of relay G in the wipe-out register connects ground to leads C and D which serve to hold the relays in the selector finder, Fig. 6, energized. The ground on lead C also lights a busy lamp BL in the wipe-out register. Ground through contact 4 on relay G energizes the ST lead to the wipe-out sender, Fig. 9. Simultaneously, the operation of relay G connects the winding of relay L through contact 5 of relay G to the PU lead to the wipe-out sender. The wipe-out sender begins to function as described for a normal call, and after the first preliminary pulse, which operates relays A and B in the wipe-out sender, ground is connected through the normal contact of relay 1, through contact 4 of relay B, through contact 2 of relay A, to lead PU, and operates relay L in the wipe-out register.

The operation of relay L connects ground through contact 1 of relay L and through the normal contact 3 of relay RL to relay J thereby operating it. The operation of relay J disconnects relay B from the line but the same ground which operated relay J holds relay G operated through the normal contact 1 of relay B when relay B releases. The operation of relay J removes the negative battery from lead A so that pulses may be sent over lead A to the subscriber's equipment. With the operation of relay J, ground is fed through contact 3 of relay G, through contact 3 of relay J, through the normal contact 1 of relay B, to hold relay G when relay L releases. The ground from contact 3 of relay G also maintains ground on contact 3 of relay L. With the operation of relay 1 in the wipe-out sender, Fig. 9, relay L in the wipe-out register, Fig. 10, releases. This operates relay WO, Fig. 10, through the normal contact 3 of relay L, and contacts 3 of relays J and G, to ground. The wipe-out sender now continues to operate as for a normal call, and sends ten negative and ten positive pulses on lines A and B to the subscriber's equipment. After the transmission of the train of ten pulses, relay L, Fig. 10, again operates in the same manner as before operating relay RL in series with relay WO to ground at contact 1 of relay L. The operation of relay RL releases relay J, at contact 3 of relay RL.

The wipe-out sender continues to count and when relay 1 operates, relay L again releases, releasing relays G, RL and WO.

The release of the relay G removes the starting ground from the wipe-out sender, and also removes the holding grounds from leads C and D. The removal of ground from leads C and D causes the selector finder and selector equipment to release, and the release of the selector equipment sends out positive signal battery on lead A and negative signal battery on lead B, operating the AP and BN relays in the subscriber's equipment, and releasing the subscriber's equipment, as described for a normal call.

At any time prior to the completion of dialing of a call the subscriber may release the equipment in the event that he has dialed an incorrect number, or for any other reason. This is accomplished by the subscriber depressing the "Error" key which, until wipe-out begins, has ground supplied to it through the normal contact 2 of relay D. The operation of the "Error" key connects this ground to the coil of the relay C thereby short-circuiting it and releasing relay C. The release of the relay C removes the locking battery for the relay C at contact 5 so that it cannot reoperate until the "Start" key is again operated. Depending upon the progress of the call, when the subscriber depresses the "Error" key, the release of relay C at its contact 4 will open the operating path for relay B in either the selector or register. With the release of relay B, (Fig. 5 or Fig. 8), relay G in either the selector or register will release and the release of relay G will remove ground from leads C and D and all selector and register equipment will restore to normal, as described above. The release of relay C also extinguishes the "In use" lamp, and releases any other operated relays in the subscriber's equipment, as previously described. After wipe-out has begun ground is removed from the "Error" key by the operation of relay D, rendering this key inoperative.

The following is the description of the clock circuit for automatically releasing the equipment when a subscriber depresses the "Start" key but does not begin dialing within a predetermined time interval. When the selector, Fig. 5, is set in operation, ground over line B from the subscriber's station operates relay B. The operation of relay B operates relay G. Relay G closes in part a circuit through its contact 3 for operation of the relay L. When the clock contact closes, ground from the clock contact operates relay TA. Relay TA operates relay TB from ground through contact 1 of relay TA. When the clock contact opens, relay TA releases completing a path for ground through the normal contact 1 of relay TA, contact 1 of TB, normal contact 3 of relay L in the selector, through contact 3 of relay G to the winding of relay L. Relay L operates and locks to ground through contact 3 of relay L. The operation of relay L completes a path through its contact 1 for operating relay K when the clock again closes its contact. The path is completed when the clock again operates relay TA which connects ground through contact 3 on relay TA, and contact 1 on relay L, to the relay K. The operation of relay K opens the circuit to relay G which releases and in turn relay G releases relay L. The operation of relay K also opens the operating path of relay B which upon releasing, operates relay H. The path for operating relay H is ground through contact 3 of relay K, normal contact 3 of relay B to the winding of relay H. The operation of relay H connects plus and minus signal battery to the contacts of relay K. As previously stated, relay L releases, thereby releasing relay K which completes the path for connecting plus and minus signaling battery to lines A and B. This releases the subscriber's equipment. The release of relay K also removes ground from relay H, thereby releasing it. The release of relay G releases the line finder and selector equipment, and extinguishes light BL. After the subscriber has dialed one digit, relay K will be operated, extending the call to a register circuit, relay G will be normal, and the time release feature will no longer be operative.

If a subscriber dials one or two or three digits, but not four, the automatic time release feature previously described and which is associated with a selector will not be effective, but the associated register circuit will be in an off-normal condition. Under this condition, the operator may release the equipment by depressing the key RK (Fig. 8) which is associated with the register circuit of the operator's position. The depression of the key RK operates relay R which at its normal contact 3 removes ground from contact 2 of relay G, thereby releasing any of the relays H, T or U which had been operated and removing ground from line D thus releasing the associated selector. The release of the selector releases relay B of the register, Fig. 8, and a circuit is established through the normal contact 1 of relay B, normal contact 3 of relay G, contact 4 of relay C, to lead ST, starting the wipe-out sender which restores the indicators associated with the operator's register as previously described. The register then restores to normal as on a regular call. The subscriber's equipment is restored to normal by the disconnect switching pulse sent out by the selector as it releases. After a subscriber has dialed four digits as in a normal call, the release key RK will no longer be effective because relay W will be operated at the completion of dialing the fourth digit supplying ground through its contact 4 directly to contact 2 of relay G.

At any time during the transmission of a call from the sender, the operator may stop the transmission and restore the sender to normal by a depression of the key RK, Fig. 11. Depression of this key opens the holding circuit for relay N, Fig. 11, and relay K, Fig. 8, causing both these relays to release. As previously described, the release of relay N restores all sender circuits to normal and the release of relay K restores the register and associated equipment to normal, the selector circuit as it releases transmitting the disconnect switching pulse to the subscriber's equipment.

As previously described, relay AS, Fig. 11, remains operated during a complete transmission from the sender from ground on the vibrating contact of relay AW. If a transmission has not been completed and the sender restored to normal by the time relay AW has ceased vibrating thereby releasing relay AS, a circuit is established through normal contact 1 of relay AS to operate relay AL, from ground through make contact 1 of relay N, normal contact 1 of relay P, contact 1 of relay Q, normal contact 1 of relay AS to the winding of relay AL. Relay AL at its contact 1 lights lamp KO as an alarm indication. The release of relay AS removes ground at its make contact 1 from lead 1, Figs. 11, 12 and 13, thereby releasing all operated relays in the sender except relay Q and the operated storage relays, (which are held operated from ground at contacts of relay N), and relay N which is held operated by the associated register.

The operator's key equipment is connected to the sender through the medium of a transfer switch indicated schematically on Figs. 11, 12 and 13. This switch is included so that the sender equipment may be provided in duplicate and by the operation of the transfer switch, the operator's key equipment may be transferred at will from one sender to the other.

Referring to Fig. 8, the circuit for operating relay K in series with relay N of Fig. 11 is brought through contact 5 of relay S. This prevents premature starting of the sender circuit through accidental depression of the start key SK because the operating circuit for relays K and N will not be completed until the register circuit has completed blanking out of the subscriber indicators and relay S has operated. The ground supply for operating the K relays of all registers available to one operator is obtained from normal contact 1 of relay N in the sender in use by that operator. It follows that when key SK, Fig. 8, of one register has been depressed, thereby operating relay K of that register, and relay N, Fig. 11, of the associated sender, ground will be removed from the windings of all relays K in other registers associated with the same operator's position and the depression of key SK in any other register will be ineffective until the sender has completed the transmission, thereby releasing relay N.

Referring to Figs. 11, 12 and 13, it will be seen that the locking circuits for the storage relays of the stock number groups are carried directly to make contact 3 of relay N, Fig. 11, but the locking circuits for the other storage relay groups are carried through the windings of relays K—1, K—2 and K—3, Fig. 13, in the following combinations: The locking circuits of the storage relays in groups TLA, ULA, FLA and FOP are carried through the winding of relay K—1. The locking circuits for the storage relays of groups THI, UHI, FHI and FLO are carried through the winding on relay K—2. The locking circuits for the storage relays of groups TOP, UOP, TLO and ULO are carried through the winding of relay K—3. All of the above locking circuits terminate in ground at make contact 3 of relay N, Fig. 11. It follows that, depending upon the operated combination of storage relays, which in turn depends upon the combination of keys depressed by the operator, one or more of the relays K—1, K—2 or K—3 may be operated. Relays K—1, K—2, K—3 control the sequence of operation of relays ST—1, ST—2, A—1, A—2, B—1, B—2, C—1 and C—2, and the number of sequential series of pulses transmitted to the subscriber before the sender releases will be dependent upon the keys depressed by the operator. In the complete transmission previously described relays K—1, K—2, and K—3 were assumed to have been operated so that a complete transmission of "open", "high", "low" and "last" prices was transmitted to the subscriber's equipment.

If it is assumed, for example, that only a "last" price had been written by the operator before depressing her start key so that storage relays only in the groups TLA, ULA and FLA would be operated, relay K—1 would be operated but not relays K—2 and K—3. In this case, relays ST—1, ST—2 and A—1 would operate as in the case previously described in detail, but following the transmission of the "last" price there would be provided no path for the operation of relay A—2; instead, the circuit which in the previous case operated relay A—2 would in this case be directed through normal contact 1 of relay K—2 and normal contact 1 of relay K—3 to the winding of relay C—2 which would operate and control the disconnection and release of the sender equipment as previously described. Under the above condition, since there were no keys depressed for fractions digit of the "open" price, no storage relays in the FOP group will be operated so that no transmission for this digit will take place. Other combinations of operated keys, as will be readily seen, will produce various combinations of operated K—1, K—2 and K—3 relays which through their contacts control the sequence of operation of relays ST—1 to C—2, and therefore, the proper transmission to the subscriber's equipment corresponding to the prices written on the keyset by the operator will take place accordingly. In every case a proper switching pulse will be sent to the subscriber's equipment preceding each price transmission under control of contacts 2 of relays ST—2, A—2 and B—2. It is seen from the foregoing that the sender will transmit only the necessary number of sequential transmissions for each quotation to transmit completely the information set up on the keyset; the sequential transmission being controlled by the relays ST—1 to C—2 and the operation of these relays being controlled through the contacts of relays K—1, K—2 and K—3. The release and restoration of the sender to normal is controlled by the operation of relay C—2 which may operate following the completion of any price transmission depending upon the operated combination of relays K—1, K—2 and K—3.

When two or more dial sets as shown on Fig. 2 are connected to the same pair of lines A and B, a feature is provided whereby the operation of the start key of any one of these several dial sets so connected to the same pair of lines will render the start keys of the other dial sets of this group inoperative. Referring to Fig. 2, battery from normal contact 5 of relay C is connected in series with contact 5 of relays C of all of the other dial sets of this group and the battery springs of all start keys of this group are connected together so that the operation and release of any start key of the group will remove battery from all other start keys within a group by operating its associated relay C. This circuit arrangement prevents a second subscriber in the group from interfering with a call previously started by any other subscriber within the group.

The operation of the start key of the subscriber's dial set, Fig. 2, causes the operation of relay C, which connects incoming lines A and B to the relay equipment of this unit. The operation of relay C causes the first idle line finder to function and connect the subscriber's dial set through the selected line finder to the associated selector. There is one selector for each line finder, and a plurality of line finders equal in number to the number of simultaneous calls which may be in progress. The chosen selector has access to three groups of selector finders; the first group being associated with the operator's registers for stocks having a first letter of the stock abbreviation from A to J, the second group associated with the operator's registers for use with stocks K to Z, and the third group with a plurality of wipeout registers, Fig. 10, shown on the bottom of Fig. 1. The selection, as of the three groups, is made by the first digit dialed by the subscriber, a particular digit, as 6, being used for the A to J stocks, 7 for the K to Z stocks, and the digit 0 for the selection of the selector finder associated with the wipeout registers.

After the line finder and selector have been connected to the dial set, the operation of the B relay in the selector places positive battery on the B wire of the operator's dial set and operates the BP relay thereof. The ready lamp lights as a visual indication to the subscriber that the equipment at the central office is ready to receive dial pulses. If the subscriber now dials the digit 6, a selection will be made of one of the plurality of selector finders, Fig. 6, in the upper row of selector finders. Associated with each selector finder of the upper two rows of selector finders is an operator's register consisting of relays and three indicator units for storing the hundreds, tens and units digits of the stock number. As the hundreds, tens and units digits of the stock number are dialed, the corresponding indicator units of the selected operator's register are successively actuated in accordance with the dial pulses received for each digit. The B relay in the selector, Fig. 5, repeats the dial pulses for the thousands digit of the stock number and operates the selector counting chain which controls the connection of the lines A and B through the guard circuit to an idle selector finder and operator's register. This transfer of the lines A and B from the selector to the register is under control of slow-releasing relay F which is held operated during the dialing of the first digit. The B relay of the operator's register is now connected over the B line through the dial contacts to ground, and replaces the B relay of the selector for the remaining three digits of the stock number. The B relay of the register circuit repeats the dial pulses for the hundreds digit of the stock number to the hundreds operator's indicator unit, and at the conclusion of these dialing pulses the slow-releasing relay F, which is held operated during the transmission of this digit, releases and transfers the circuit from the contact of the relay B from the hundreds indicator unit to the tens indicator unit of the operator's register under control of counting relays T, U and H, of Fig. 8. This circuit is likewise transferred from the tens operator's indicator unit to the units operator's indicator unit at the conclusion of the dialing of the third digit. After the fourth digit has been dialed, the relay W of the operator's register operates and places negative battery on the subscriber's line A, causing the subscriber's line relay AN to operate. The BP relay of the dial set now reoperates when the off-normal contacts of the dial again open, and the condition of negative battery on the A line and positive battery on the B line simultaneously causes the dial set to function so that succeeding pulses of alternate polarity on both lines A and B will normalize all indicators of the dial set.

The operation of the W relay of the operator's register also starts the wipeout sender, Fig. 9, for normalizing the indicators of the subscriber's dial set. The first pulse of the wipeout sender is not used for normalizing the subscriber's indicators but at the conclusion of this pulse the relay J, of the operator's register, operates and transfers the lines A and B to the wipeout sender so that the second pulse of the wipeout sender, under these conditions, is the first pulse used for normalizing these indicators. The wipeout sender continues its operation until the registers at the operator's position have been normalized. After the tenth restoration pulse has been transmitted, the relay J is released, disconnecting the wipeout sender from the subscriber's lines A and B and re-connecting the lines A and B to the operator's register circuit. The re-connection of relay B to the line B operates the BP relay of the subscriber's dial set and prepares the dial set for the reception of impulses corresponding to the stock number information.

The operator transcribes on her keyboard the last three digits of the stock number, and such other digits as may be required to complete the price information. After all necessary keys as to stock number and price information have been depressed, the operator depresses the start key associated with the particular register she has chosen to answer. The depression of the start key operates relays K of the operator's register, Fig. 8 and N of the sender, Fig. 11. The relay K functions to transfer the A and B lines from the operator's register to the sender, and the relay N starts the sender in operation. The operation of relay R in Fig. 11, following the operation of relay N, causes the transfer of the stock number and price information from the contacts of the operated keys of the operator's keyset to the corresponding key relays of the sender, and also releases all operated keys of the operator's keyset so that the operator may immediately start transcribing the stock and price information for another stock during the transmission of the information requested by the previous call. The first information transmitted by the sender is the stock number, the first digit thereof being automatically provided by the sender without any corresponding key set-up. At the end of the series of impulses for the stock number, the ST2 relay in the sender operates and connects negative battery on the B wire to the dial set operating the BN relay thereof momentarily to prepare the dial set for the second set of pulses from the sender. These pulses operate the tens, units and fractions of the "last" and fractions "open" indicators. In a similar manner, the second and third groups of pulses are sent, the second group operating the fractions "low" and the tens, units and fractions "high" indicators, and the third group operating the tens and units "open" and "low" indicators. The switching pulses for each set of pulses for the various ranges are furnished by the ST2, A2 and B2 relays of the sender circuit, respectively under control of relays K1, K2 and K3. The ST2, A2 and B2 relays operate successively after each set of pulses for the price information transmitted. Before the transmission of the first set of pulses, the relay ST1 of the sender is operated, and at the conclusion of this set of pulses the ST2 relay operates and transmits the switching pulse required for the reception of the first set of pulses for the price information. The ST2 relay controls the operation of the A1 relay when the NA relay operates which connects the key relays for the control of the second set of pulses. In a similar manner, relays A2 and B1 control the third set of pulses and B2 and C1 control the fourth or last set of impulses required for the transmission of the stock number and prices. The operation of relay C2 at the conclusion of the fourth set of pulses releases relay N causing the sender to restore, and also releases relay K of the register which releases the register. The release of the register releases the K relay of the selector which releases the selector and provides the release pulse for the subscriber's unit.

When the start key of the operator's keyset was depressed, the relay D of the register operated and removed the actuating ground from all indicators of the operator's register and operated the E relay which connects the wipeout pulses from the impulse machine to the operator's indicators. After ten impulses have been sent to the operator's indicators, the RL relay in the wipeout sender operates, and releases the relay C in the register which in turn releases the relay W. The release of relay W stops the wipeout sender, provided no other relays W of other operator registers are operated. The release of relay C also releases relay E disconnecting the impulse cams from the operator's registers.

When wipeout only of the subscriber's dial set, Fig. 2, is required, the digit 0 is dialed causing the selection of one of the selector finders, Fig. 6, at the bottom of Fig. 1. With each of these selector finders is associated a wipeout register, Fig. 10, for controlling the transmission of ten pulses from the wipeout sender, Fig. 9, to the indicators of the subscriber's dial set. These pulses are preceded by a wipeout switching signal consisting of negative battery on A and positive on B, as an indication to the dial set that wipeout pulses are to be transmitted. The release signal at the conclusion of wipeout pulses is furnished by the selector, as in the case previously described.

Two or more dials may be connected to one or more display units, but the number of display units of any pair of line wires A, B, must not exceed the number of dials on the same pair. For example, it is permissible to connect three dials to one display unit or three dials to three display units, but four display units may not be connected on the same pair with three dials.

While the invention has been described with particularity as to one preferred embodiment of a combination of mechanisms and of each of the various elements of the combination, it is to be understood that this has been done for purposes of disclosure and that various changes and substitutions may be readily apparent to those skilled in the art after understanding the invention herein disclosed, and that the terms employed in the claims are, therefore, to be considered as words of description rather than of limitation.

What we claim is:

1. The combination of a plurality of calling stations, a called station including a plurality of sets of groups of indicators, manipulative impulse transmitting means in each subscriber's equipment, means responsive to impulses transmitted by any calling station for connecting and operating an idle group of indicators in any set, and means providing for operation of an idle group of indicators in any set during the operation of any group or groups of indicators in the same or another set.

2. The combination of a plurality of subscribers' equipments, a central station including a plurality of sets of groups of operators' indicators, manipulative signal transmitting means in each subscriber's equipment, means responsive to signals transmitted by any subscriber for connecting and operating an idle group of indicators in any set, and means providing for operation of an idle group of indicators in any set during the operation of any group or groups of indicators in the same or another set.

3. In a system of the character described, the combination of a subscriber's equipment including manipulative impulse transmitting means and posting means; a central station including posting means, a transmitter, settable means for controlling said transmitter and start means associated therewith; means responsive to impulses transmitted by the subscriber's manipulative means for connecting his equipment to the central station and for operating the posting means at the central station, means responsive to an operation of the start means for responsively connecting the subscriber's posting means to the transmitter and for setting said transmitter in operation under control of said settable means, and means for preventing an effective operation of the start means during an operation of the posting means at the central station.

4. In a system of the character described, the combination of a subscriber's equipment including manipulative impulse transmitting means and posting means; a central station including posting means, a transmitter, settable means for controlling said transmitter and start means associated therewith; means responsive to impulses transmitted by the subscriber's manipulative means for connecting his equipment to the central station and for operating the posting means at the central station, means responsive to an operation of the start means for responsively connecting the subscriber's posting means to the transmitter and for setting said transmitter in operation under control of said settable means, and means also responsive to an operation of the start means for automatically deleting the information posted at the central station.

5. The combination of a plurality of subscribers' equipments, each including indicators and manipulative impulse transmitting means, a central station including a plurality of sets of groups of operators' indicators each having a normal home position, a transmitter and settable controlling devices for each set, start means associated with said groups of indicators and the associated transmitter, means responsive to impulses transmitted by any subscriber's manipulative means for connecting the subscriber's equipment to and for operating any idle group of operator's indicators in any set, means responsive to an operation of the associated start means for setting the associated transmitter in operation to operate the subscriber's indicators, and means also controlled by said start means for normalizing the associated group of operator's indicators.

6. In a signalling system, the combination of a first device including manipulative impulse transmitting means and posting means; a second device including posting means, a transmitter, settable means for controlling said transmitter and means for initiating operation of the transmitter; means responsive to impulses transmitted by the manipulative means of said first device for connecting the first device to said second device and for operating the posting means of the second device, means automatically operable after said last mentioned posting means has been operated for deleting the information posted by the first device, means responsive to an operation of said initiating means for responsively connecting the posting means of the first device to the transmitter and for setting said transmitter in operation under control of said settable means, and means also responsive to an operation of said initiating means for causing said deleting means to delete the information posted by the second device.

7. In a signalling system of the character described, the combination of a subscriber's equipment including manipulative impulse transmitting means and posting means; a central station including posting means, a transmitter, settable means for controlling said transmitter and means for initiating operation of the transmitter; means responsive to impulses transmitted by the subscriber's manipulative means for connecting his equipment to the central station and for operating the posting means at the central station, means automatically operable after said last mentioned posting means has been operated for deleting the information posted at the subscriber's equipment, means responsive to an operation of said initiating means for responsively connecting the subscriber's posting means to the transmitter and for setting said transmitter in operation under control of said settable means, and means also responsive to an operation of said initiating means for causing said deleting means to delete the information posted at the central station.

8. In a quotation system, the combination of a transmitter, a receiver, electrical circuit connections over which operating impulses are transmitted from the transmitter to the receiver, a plurality of groups of indicators in the receiver, certain of said connections being individual to certain of said indicators, and switches in the receiver each operable to connect different combinations of indicators of different groups of indicators to said circuit connections whereby indicators of several groups may be variably operated concurrently in response to the impulses transmitted over the corresponding connections to which they are connected, one of said combinations including a plurality of indicators in one of said groups.

9. In a quotation system including a receiver, a pair of transmitters, a plurality of sets of indicators in the receiver, each indicator having a normal home position, switching means for connecting said indicators to one of said transmitters, means for controlling said switching means for simultaneously connecting all of said indicators to said transmitter for normalizing said indicators, and means for controlling said switching means to successively connect predetermined combinations of the individual indicators of the different sets to the other of said transmitters for setting-up operations.

10. The combination of a plurality of subscribers' equipments, each including indicators and manipulative signal transmitting means, a central station including a plurality of sets of groups of operators' indicators each having a normal home position, a transmitter and settable controlling devices for each set, a start key associated with each group of indicators and the associated transmitter, means responsive to signals transmitted by any subscriber's manipulative means for connecting the subscriber's equipment to and for operating any idle group of operator's indicators in any set, means responsive to an operation of the associated start key for setting the associated transmitter in operation to operate the subscriber's indicators, and means also controlled by said start key for normalizing the associated group of operator's indicators.

11. In a system of the character described, the combination of a subscriber's equipment including manipulative impulse transmitting means and posting means; a central station including posting means, a transmitter, settable means for controlling said transmitter and a start key; means responsive to impulses transmitted by the subscriber's manipulative means for connecting his equipment to the central station and for operating the posting means at the central station, means responsive to an operation of the start key for responsively connecting the subscriber's posting means to the transmitter and for setting said transmitter in operation under control of said settable means, and means for preventing an effective operation of the start key during an operation of the posting means at the central station.

12. In a system of the character described, the combination of a subscriber's equipment including manipulative impulse transmitting means and posting means; a central station including posting means, a transmitter, settable means for controlling said transmitter and a start key; means responsive to impulses transmitted by the subscriber's manipulative means for connecting his equipment to the central station and for operating the posting means at the central station, means responsive to an operation of the start key for responsively connecting the subscriber's posting means to the transmitter and for setting said transmitter in operation under control of said settable means, and means also responsive to an operation of the start key for automatically deleting the information posted at the central station.

13. In a system of the character described, the combination of a subscriber's equipment including manipulative impulse transmitting means and posting means; a central station including posting means, a transmitter, settable means for controlling said transmitter and a start key; means responsive to impulses transmitted by the subscriber's manipulative means for connecting his equipment to the central station and for operating the posting means at the central station, means automatically operable after said last mentioned posting means has been operated for deleting the information posted by the subscriber's equipment, means responsive to an operation of the start key for responsively connecting the subscriber's posting means to the transmitter and for setting said transmitter in operation under control of said settable means, and means for rendering said start key ineffective prior to the completion of the operation of said deleting means.

14. In a system of the character described, the combination of a subscriber's equipment including manipulative impulse transmitting means and posting means; a central station including posting means, a transmitter, settable means for controlling said transmitter and a start key; means responsive to impulses transmitted by the subscriber's manipulative means for connecting his equipment to the central station and for operating the posting means at the central station, means automatically operable after said last mentioned posting means has been operated for deleting the information posted by the subscriber's equipment, means responsive to an operation of the start key for responsively connecting the subscriber's posting means to the transmitter and for setting said transmitter in operation under control of said settable means, and means also responsive to an operation of the start key for causing said deleting means to delete the information posted at the central station.

15. In a quotation system, the combination of a transmitter, a receiver, electrical channels over which operating impulses are transmitted from the transmitter to the receiver, a plurality of groups of indicators in the receiver, certain of said channels being individual to certain of said indicators and switches in the receiver each operable to connect different combinations of indicators of different groups of indicators to said channels whereby indicators of several groups may be variably operated concurrently in response to the impulses transmitted over the corresponding channels to which they are connected, one of said combinations including all of the indicators of one group.

16. In a quotation system, the combination of a receiver, a transmitter, electrical channels connecting the same, a group of stock designation indicators and at least one group of price indicators in the receiver, each indicator having a normal home position, means responsive to characteristic impulses received for connecting said groups of indicators to said channels, means in the receiver for transmitting a call to the transmitter, and means in the transmitter automatically operable after a call has been received for transmitting impulses for simultaneously connecting all of said indicators to said channels and for transmitting impulses to concurrently normalize all of said indicators.

17. In a quotation system comprising a receiver having stock designation and groups of price indicators, a transmitter comprising settable devices for controlling the transmission of impulses representing a stock designation, groups of settable devices equal in number to the groups of price indicators for controlling the transmission of impulses for selecting and operating the price indicators, means for causing the transmission of stock designation impulses followed by a predetermined sequential order of transmission of selecting and operating impulses representing the price for selecting and operating the indicators of the price groups in succession, and means under control of said groups of settable devices operable to omit transmission of selecting and operating impulses corresponding to unoperated settable devices and immediately transmit selecting impulses corresponding to the first group of settable devices to be operated.

18. In a quotation system, the combination of a receiver including a plurality of groups of indicators, a transmitter including a plurality of groups of price settable devices equal in number and corresponding to said groups of indicators, transmission channels connecting the transmitter to the receiver, switching devices in the receiver for connecting indicators to said channels for operation, and means in the transmitter for transmitting switching impulses under control of said groups of operated price settable devices for connecting the groups of indicators corresponding to said operated groups of settable devices to said channels and for controlling the transmission of operating impulses thereto.

19. In an apparatus of the character described, the combination of a plurality of subscribers' equipments each comprising a call key, a dial set and price indicators each having a normal home position, a central operating station including a plurality of groups of selector finders, a plurality of groups of indicators, a wipe-out sender, a keyboard for receiving a set-up as to the price, means operated upon operation of the call key and the dialing of the first digit of a stock number for connecting the calling subscriber's equipment to one of the groups of selector finders, said selector finders connecting the calling subscriber's lines to one of said several groups of indicators, means operated as the last three digits of the stock number are dialed for operating the selected group of indicators, means operated upon completion of the dialing operation for connecting the wipe-out sender to the subscriber's indicators for moving said indicators into their normal home position, and a transmitting mechanism operatable under control of the keyboard for transmitting impulses for setting up the indicators in the subscriber's equipment.

20. In an apparatus of the characted described, the combination of a plurality of subscribers' equipments each comprising a call key, a dial set and indicators each having a normal home position, a central operating station comprising a plurality of groups of selector finders, a plurality of groups of indicators, a keyboard for receiving a set-up, means operated upon operation of the call key and the dial in dialing the first digit of a stock number for connecting the subscriber's equipment to one of said groups of selector finders, said selector finders connecting the subscriber's lines to one of said several groups of indicators, means operated as the last three digits of the stock number are dialed for operating said connected indicator units, means operated upon completion of the operation of said indicator units for normalizing the indicator units in the subscriber's equipment, and a transmitting mechanism operatable under control of the keyboard for transmitting impulses for setting up the indicators in the subscriber's equipment.

21. In an apparatus of the character described, the combination of a plurality of subscribers' equipments each comprising a call key, a dial set and indicators each having a normal home position, a central operating station comprising a plurality of groups of indicators, a keyboard for receiving a set-up, means operated upon operation of a call key and the dial in dialing the first digit of a stock number for connecting the subscriber's equipment to one of said several groups of indicators, means operated as the last three digits of the stock number are dialed for operating said connected indicator units, means operated upon completion of the operation of said indicator units for normalizing the indicator units in the subscriber's equipment, a transmitting mechanism operatable under control of the keyboard for transmitting impulses for setting up the indicators in the subscriber's equipment, and means in the central operating station operatable upon dialing a certain predetermined number for normalizing the subscriber's indicators without displaying said number in the central operating station.

22. In a quotation system comprising a plurality of subscribers' equipments, each including a set of stock designation indicators, a plurality of sets of price indicators, each set of price indicators comprising a smaller number of indicators than the set of stock designation indicators, each indicator having a normal home position, and means for transmitting a stock designation; a central operator's station comprising stock designation indicators operable by said stock designation transmitting means in a subscriber's equipment, keysets for setting up stock designations and prices, a wipe-out sender, a transmitter operable under control of said keysets, means automatically operable after a stock designation has been set up on the operator's indicators for setting said wipe-out sender into operation to simultaneously normalize all of the stock designation and price indicators in the calling subscriber's equipment, an operator's start key for setting the transmitter in operation under control of said keysets for setting up the stock designation on the calling subscriber's indicators and for selecting and setting up a number of price indicators equal to the number of stock designation indicators.

23. In a quotation system, the combination of a plurality of subscribers' equipments each including stock designation and price indicators each having a normal home position, and means for setting up a stock designation for transmission to a central station comprising a plurality of operators' sending equipments each including a keyboard, a wipe-out sender, a transmitting mechanism; a plurality of groups of stock designation indicators each having a normal home position, and a corresponding plurality of start keys, means operable under control of said stock designation setting-up means in any subscriber's equipment for connecting said equipment to an operator's equipment over which information relative to any desired stock is transmitted and for registering said designation on an unused group of indicators of said operator's equipment, means thereafter operable to set said wipeout sender in operation to normalize the calling subscriber's indicators, means thereafter operable to render said start keys effective to connect the wipeout sender to the associated operator's indicators and to set the transmitter in operation to set up the subscriber's indicators under control of the operator's keyboard, and means for automatically controlling the transmission of characteristic switching impulses for operating such of the subscriber's indicators as correspond to the operator's keys depressed.

24. In a quotation system, the combination of a transmitter, a receiver including a group of stock designation indicators and several groups of range price indicators, a plurality of electrical controlling channels connecting said receiver to said transmitter, the number of channels being equal to the number of stock designation indicators and being of a larger number than the number of indicators in at least some of said groups of range price indicators, switching devices in the receiver for simultaneously connecting the stock designation indicators to said channels, switching devices for successively connecting predetermined indicators of the several groups of range price indicators to said channels whereby the indicators of the groups of range price indicators may be operated by a smaller number of groups of impulses than the number of groups of range price indicators.

25. In a system of the character described, the combination of a plurality of subscribers' equipments each including a start key and a dial, a pair of lines for each equipment, a wire center including a plurality of line finders, a central operating station including a selector for each line finder, a plurality of groups of selector finders accessible to each selector, an operator's register associated with each selector finder, operator's stock designation indicators in each register, means responsive to an operation of the subscriber's start key for connecting his pair of lines to his equipment and for setting the first idle line finder in operation, means in said line finder for connecting said lines to the associated selector in the central station, means in the connected selector responsive to the first dial operation for selecting a group of selector finders, means in the connected selector for transferring the lines from said selector to the first idle selector finder of the particular group of selector finders selected, means in said selector finder for connecting said lines to its associated register, and means in said register responsive to further dial operations for successively operating the operator's indicators of said register.

26. In a system of the character described, the combination of a plurality of subscribers' equipments each including a start key, a dial and indicators having a normal home position, a pair of lines for each equipment, a central operating station including operator's indicators and a wipeout sender, means responsive to the depression of a start key and a first dial operation for connecting the subscriber's equipment to the operator's indicators, means responsive to further dial operations for setting up the operator's indicators, means operable after said indicators have been set up for transmitting a switching signal to the subscriber's equipment, means in the subscriber's equipment controlled by said signal for operatively connecting all of the subscribers' indicators to the subscribers' lines, means also operable after the operator's indicators have been set for setting said wipeout sender in operation, means for transferring the subscriber's lines from the operator's indicators to the wipeout sender, and means associated with the subscriber's indicators and responsive to pulses received from said wipeout sender for normalizing the subscriber's indicators.

27. In a system of the character described, the combination of a plurality of subscribers' equipments each including a start key, a dial and indicators each having a normal home position, a central operating station including operator's indicators each having a normal home position, a wipeout sender and a transmitter for transmitting signals corresponding to information requested by the calling subscriber, means responsive to the operation of the start key and first operation of the dial for connecting the subscriber's equipment to the operator's indicators, means responsive to a further dialing operation for setting up the operator's indicators, means operable after said indicators have been adjusted for conditioning the subscriber's equipment to respond to impulses received, for transferring the connection from the operator's indicators to the wipeout sender and for setting the wipeout sender in operation, means for setting the transmitter in operation, means for transferring the connecting lines from the wipeout sender to the transmitter, and means for connecting the operator's indicators to the wipeout sender.

28. In a system of the character described, the combination of a plurality of subscribers' equipments each including a start key, a dial, a group of indicators each having a normal home position, a central operating station including a plurality of groups of operator's indicators each having a normal home position, means responsive to the operation of a start key and the first operation of the dial for selectively connecting the subscriber's equipment to one of said groups of operators' indicators, a wipeout sender, means operable at the conclusion of an operation of the operator's indicators for conditioning the subscriber's indicators for operation, for setting the wipeout sender in operation and for transferring the subscriber's connections from the operator's indicators to the wipeout sender, a transmitting equipment associated with each group of operator's indicators, a start key associated with each group of operator's indicators, means responsive to the depression of the start key associated with the operated operator's indicators for transferring said subscriber's connections from the wipeout sender to the associated transmitter and for associating the wipeout sender with the operator's indicators, and means in the subscriber's equipment responsive to pulses transmitted by said transmitter for operating the subscriber's indicators.

29. In a system of the character described, the combination of a plurality of subscribers' equipments each including a start key, a dial, a group of indicators for displaying the stock designation and at least one group of indicators for displaying the price, each indicator having a normal home position, a central operating station including operators' indicators, a wipeout sender, a transmitter and a start key, means responsive to the operation of the subscriber's start key and the first operation of the dial for connecting the subscriber's equipment to the operator's indicators, means responsive to further dial operations for operating the operator's indicators, means operable at the conclusion of the operation of said operator's indicators for transmitting a switching signal to the subscriber's equipment and for setting the wipeout sender in operation, means in the subscriber's equipment responsive to said signal for conditioning all of the subscriber's indicators for simultaneous normalizing operation, means responsive to pulses of the wipeout sender for transferring the subscriber's lines from the operator's indicators to the wipeout sender, means responsive to further pulses from said wipeout sender for normalizing the subscriber's indicators, means operable after a sufficient number of pulses have been transmitted to normalize said subscriber's indicators, for transmitting a signal to the subscriber's equipment, means responsive to said signal for connecting the subscriber's stock indicators to the subscriber's lines, means operable upon the depression of the operator's start key for connecting the subscriber's lines to the transmitter and for setting the transmitter in operation for setting up the subscriber's stock indicators, and means also responsive to the operator's start key for connecting the wipeout sender to the operator's indicators for normalizing the same, means controlled by the transmitter for transmitting a switching signal, and means in the subscriber's equipment responsive to said switching signal for operatively associating the subscriber's price indicators with the subscriber's lines for operation thereof by further pulses transmitted by said transmitter.

30. In a system of the character described, a receiver, a plurality of groups of indicators in said receiver, a transmitter, a plurality of groups of settable devices for controlling said transmitter, a plurality of channels less in number than the number of settable devices and indicators, means connecting certain of said indicators to said channels, means for connecting said transmitter to said channels, means for setting said transmitter in operation under control of settable devices corresponding to said connected indicators for operating said connected indicators, a counting device for controlling the number of pulses sent out by said transmitter under control of said settable devices, means operable at the conclusion of the operation of said counting device for transmitting a switching signal to connect other of said indicators to said channels and for operating the transmitter under control of corresponding settable devices and a reoperation of said counting device, to operate said last connected indicators.

HANS P. BOSWAU.
RAYMOND M. HICKS.